United States Patent
Yamagata et al.

(10) Patent No.: US 7,092,232 B2
(45) Date of Patent: Aug. 15, 2006

(54) VARIABLE CAPACITANCE CAPACITOR, CIRCUIT MODULE, AND COMMUNICATIONS APPARATUS

(75) Inventors: Yoshifumi Yamagata, Kyoto (JP); Hiroshi Katta, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/169,227

(22) Filed: Jun. 27, 2005

(65) Prior Publication Data

US 2006/0018082 A1   Jan. 26, 2006

(30) Foreign Application Priority Data

Jun. 28, 2004   (JP)   ............... P2004-190454

(51) Int. Cl.
*H01G 7/00*   (2006.01)
(52) U.S. Cl. ............. 361/277; 361/272; 361/278; 361/281; 361/286; 361/287; 361/290
(58) Field of Classification Search ......... 361/278, 361/281, 286, 287, 290, 292, 299.1, 272–277; 333/174, 32–33
See application file for complete search history.

(56) References Cited

U.S. PATENT DOCUMENTS

| | | | | |
|---|---|---|---|---|
| 5,379,008 | A | * | 1/1995 | Bockelman et al. ........ 333/174 |
| 6,018,282 | A | * | 1/2000 | Tsuda ........................ 333/205 |
| 6,100,773 | A | * | 8/2000 | Nakamichi et al. ......... 333/32 |
| 6,285,542 | B1 | * | 9/2001 | Kennedy et al. ............ 361/328 |
| 6,674,321 | B1 | * | 1/2004 | York .......................... 327/586 |

FOREIGN PATENT DOCUMENTS

JP   11-260667   9/1999

* cited by examiner

*Primary Examiner*—Nguyen T. Ha
(74) *Attorney, Agent, or Firm*—Hogan & Hartson LLP

(57) ABSTRACT

A variable capacitance capacitor has a plurality of variable capacitance elements, using a thin-film dielectric layer whose dielectric constant varies with voltage application, connected in series with one another between the high-frequency signal input and output terminals. The first bias lines belonging to a high-potential side and the second bias lines belonging to a low-potential side, in terms of voltage application, are connected, alternately, to electrodes of the variable capacitance elements connected one another and electrodes in the array of the series-connected variable capacitance elements connected respectively to the input terminal and the output terminal.

15 Claims, 9 Drawing Sheets

VARIABLE CAPACITANCE CAPACITOR, CIRCUIT MODULE, AND COMMUNICATIONS APPARATUS

BACKGOUND OF THE INVENTION

1. Field of the Invention

The present invention relates to a variable capacitance capacitor having a dielectric layer whose dielectric constant is caused to vary with application of a voltage, for allowing a change in a resonant frequency by exploiting capacitive variation, and also relates to a circuit module and a communications apparatus that employ the variable capacitance capacitor. More particularly, the invention relates to an excellent variable capacitance capacitor that offers high-electrical strength, low-distortion, and low-loss characteristics, and also relates to a circuit module and a communications apparatus that employ the variable capacitance capacitor.

2. Description of the Related Art

Thin-film capacitors of the type in which the dielectric constant of a dielectric layer is caused to vary with application of a voltage have been proposed to date (for example, refer to Japanese Unexamined Patent Publication JP-A 11-260667 (1999)).

FIG. 12 is a sectional view showing an example of the thin-film capacitor proposed in JP-A 11-260667. The thin-film capacitor 200 as a variable capacitance capacitor is composed of a supporting substrate 201 on which a lower electrode layer 202, a thin-film dielectric layer 203, and an upper electrode layer 204 are laminated one after another in the order named. Specifically, the thin-film capacitor 200 is fabricated as follows. At the outset, on substantially the entire surface of the supporting substrate 201 is laminated a conductor layer for forming the lower electrode layer 202. The conductor layer is then processed into an electrode pattern through a patterning operation so as to obtain the lower electrode layer 202 having a desired configuration. Next, on the lower electrode layer 202 is formed the thin-film dielectric layer 203. The thin-film dielectric layer 203 is shaped by a known thin-film forming technique, using a mask placed at a predetermined position, or shaped by the spin coating method, followed by performing patterning or the like operation thereon to obtain a desired configuration. The thin-film dielectric layer 203 is subjected to a heat-hardening treatment on an as needed basis. Lastly, on substantially the entire surface of the thin-film dielectric layer 203 is laminated a conductor layer for forming the upper electrode layer 204. The conductor layer is then processed into an electrode pattern through a patterning operation so as to obtain the upper electrode layer 204 having a desired configuration. In this way, the thin-film capacitor 200 is realized. Note that, the thin-film dielectric layer 203, in reality, the opposed regions thereof that are held between the lower electrode layer 202 and the upper electrode layer 204 constitute a capacitance generating area.

According to the thin-film capacitor 200 thus fabricated, by adjusting the dielectric constant of the thin-film dielectric layer 203 to be a desired value through application of a predetermined direct current bias voltage (bias signal) to the thin-film dielectric layer 203, it is possible to control the capacitive characteristics. As a result, the thin-film capacitor 200 is able to function as a variable capacitance capacitor.

However, the thin-film capacitor 200 of conventional design poses the following problems. For example, as shown in the equivalent circuit diagrams depicted in FIGS. 13A and 13B, respectively, in order to operate the thin-film capacitor 200, a bias signal needs to be supplied through an external circuit (bias supply circuit) G arranged in a wiring board on which the thin-film capacitor 200 is mounted.

In FIG. 13A, a symbol A indicates a point of connection between the thin-film capacitor 200 and the bias supply circuit G. Arranged between the connection point A and a bias terminal V is a choke coil 205 acting as an inductance component.

On the other hand, in FIG. 13B, the bias supply circuit G is provided with a strip line 206 having a length equal to λ/4, where λ indicates the wavelength of a high-frequency signal for effecting the operation of the thin-film capacitor 200. The strip line 206 has its bias terminal V-side end connected to ground. Between the bias terminal V-side end of the strip line 206 and the ground portion is formed a direct current restricting capacitance element 208.

As described thus far, to put the thin-film capacitor 200 into commission, not only the thin-film capacitor 200 itself, but also the bias supply circuit G appropriate to the structure and properties of the thin-film capacitor 200 need to be prepared for use. The bias supply circuit G is placed on the wiring board. It is thus necessary to design the bias supply circuit G so as to be fit for the thin-film capacitor 200 which is mounted on the wiring board, in consequence whereof there results the need for a very complicated, time-consuming adjustment process. Furthermore, the thin-film capacitor 200 and the bias supply circuit G are fabricated independently of each other, which leads to an undesirable increase in size of the construction as a whole.

As another problem, in the case of using such a thin-film capacitor 200 as shown herein as a high-frequency electronic component, both a direct current bias voltage and a high-frequency input signal voltage (high-frequency voltage) are applied to the thin-film capacitor 200 at the same time. The direct current bias voltage acts to change the capacitance of the thin-film capacitor 200. In this case, however, if a high-frequency voltage of higher level is applied, the capacitance of the thin-film capacitor 200 will be caused to vary not only with application of the direct current bias voltage but also with application of the high-frequency voltage. As a result, energy conversion takes place whereby to produce a harmonic signal which differs in frequency from the input signal. This leads to occurrence of waveform distortion in an output signal. Moreover, given the input signal of X, then the output signal Y produced by the nonlinear thin-film capacitor 200 is expressed by the following equation (1):

$$Y = \alpha_1 X + \alpha_2 X^2 + \alpha_3 X^3 + \ldots \alpha_{n-1} X^{n-1} + \alpha_n X^n \quad (1)$$

wherein n represents a natural number, and $\alpha_1, \alpha_2, \alpha_3 \ldots \alpha_{n-1}$, and $\alpha_n$ each represent a constant. In the thin-film capacitor 200, upon application of voltages of two input signals of different frequencies expressed by the equation: $X = A \cos \omega_1 t + B \cos \omega_2 t$ (wherein A and B each represent a constant), with regard to the second to n-th terms on the right-hand member of the equation (1), the two input signals are subjected to mixing (multiplication). Due to the harmonics defined by the terms after the mixing, intermodulation distortion appears.

The waveform or intermodulation distortion cannot be suppressed without reducing the high-frequency voltage-induced capacitive variation by lowering the intensity of a high-frequency electric field. In order to reduce the capacitive variation, it is effective to make the thin-film dielectric layer 203 thicker. However, as the thickness of the thin-film dielectric layer 203 is increased, the direct current electric field intensity is decreased, which results in an undesirable decrease in the rate of capacitive variation for which the direct current bias voltage is responsible.

Besides, there arises a problem in terms of power handling capability. In general, an electric current is allowed to pass through a capacitor more easily in a high-frequency region. Therefore, in the capacitor operating in a high-frequency region, heat is generated due to the loss resistance in the capacitor, which leads to a risk of capacitor breakdown. In order to overcome such a problem associated with power handling capability, also, it is effective to make the thin-film dielectric layer 203 thicker, because the extent of heat generation per unit volume can be reduced. However, as described above, as the thickness of the thin-film dielectric layer 203 is increased, the direct current electric field intensity is decreased, which results in an undesirable decrease in the rate of capacitive variation for which the direct current bias voltage is responsible.

SUMMARY OF THE INVENTION

The invention has been devised in view of the above-described problems with the conventional art, and accordingly one object of the invention is to provide an easy-to-handle variable capacitance capacitor that has succeeded in eliminating the need to prepare an external bias supply circuit which is independent of the variable capacitance capacitor itself.

Another object of the invention is to provide a variable capacitance capacitor that is excellent in power handling capability, in which capacitive variation ascribable to a high-frequency signal can be suppressed, intermodulation distortion appears insignificantly, and a capacitance thereof is caused to vary greatly by the influence of a direct current bias.

Still another object of the invention is to provide a variable capacitance capacitor that can be employed well in a resonant circuit such as a communications apparatus.

The invention provides a variable capacitance capacitor comprising:

an array of a plurality of variable capacitance elements connected in series with one another between high-frequency signal input and output terminals, each of the variable capacitance elements employing a thin-film dielectric layer whose dielectric constant is caused to vary with application of a voltage; and a first bias line belonging to a high-potential side in terms of voltage application; and a second bias line belonging to a low-potential side in terms of voltage application, the first and second bias lines being connected, alternately, to an electrode connected to the input terminal of the variable capacitance element array, electrodes of the variable capacitance elements connected with one another, and an electrode connected to the output terminal of the variable capacitance element array.

According to the invention, in the variable capacitance capacitor including bias terminals $V_1$ and $V_2$ connected thereto as shown in FIG. 1, the plurality of variable capacitance elements are connected in series with one another between the high-frequency signal input and output terminals. Each of the variable capacitance elements employs a thin-film dielectric layer whose dielectric constant is caused to vary with application of a voltage. Moreover, the first bias line belonging to a high-potential side in terms of voltage application and the second bias line belonging to a low-potential side in terms of voltage application are connected, alternately, to the electrode connected to the input terminal of the variable capacitance element array, the electrodes of the variable capacitance elements connected with one another, and the electrode connected to the output terminal of the variable capacitance element array. In this case, it is possible to eliminate the need to prepare a bias supply circuit (inductances L1 and L2) that is mounted, as the related art, on an external wiring board independently of the variable capacitance capacitor, and thereby reduce the size of a circuit board on which the variable capacitance capacitor is mounted and simultaneously enhance the handleability.

According to the invention, in the variable capacitance capacitor, the plurality of variable capacitance elements are connected in series with one another, and the first bias line belonging to a high-potential side in terms of voltage application and the second bias line belonging to a low-potential side in terms of voltage application are connected, alternately, to the electrode connected to the input terminal of the variable capacitance element array, the electrodes of the variable capacitance elements connected with one another, and the electrode connected to the output terminal of the variable capacitance element array. In this case, a to-be-applied voltage fed through the first bias line, namely, a direct current bias voltage (bias signal), is applied to the variable capacitance elements on an individual basis, and thereafter travels toward the second bias line. It will thus be seen that the variable capacitance elements are connected in parallel with one another regarding a direct current. Therefore, the variable capacitance elements are each allowed to receive a desired direct current bias voltage. This makes it possible to make the most of the rate of capacitive variation induced by the direct current bias voltage as observed in each of the variable capacitance elements, and thereby cause the capacitance to vary greatly. Moreover, although the variable capacitance capacitor of the invention includes the plurality of variable capacitance elements, by connecting the variable capacitance elements in parallel with one another with respect to a bias signal path, it is possible to reduce the number of bias power sources for supplying the direct current bias voltage to two (only one, in the case of connecting one of them to ground), and thus helps simplify the configuration of a circuit board on which the variable capacitance capacitor is mounted.

According to the invention, in the variable capacitance capacitor, the plurality of variable capacitance elements are connected in series with one another regarding a high frequency. At the time of applying a high-frequency voltage, voltage division takes place so that the high-frequency voltage is divided among the variable capacitance elements. After all, the variable capacitance elements are each given a decreased amount of the high-frequency voltage, whereby making it possible to suppress capacitive variation that the variable capacitance capacitor incurs due to the influence of the high-frequency signal. Thus, in a high-frequency electronic component employing the variable capacitance capacitor, distortion such as waveform distortion or intermodulation distortion can be reduced greatly. Moreover, since the plurality of the variable capacitance elements are connected in series with one another regarding a high frequency, it is possible to achieve, regarding a high frequency, the same effect as achieved in the case of increasing the thickness of the dielectric layer constituting the capacitance element. This helps reduce the extent of heat generation per unit volume ascribable to a loss resistance occurring in the variable capacitance capacitor, and the power handling capability of the variable capacitance capacitor can be improved correspondingly.

As described heretofore, according to the invention, in the variable capacitance capacitor, the plurality of variable capacitance elements are connected in series with one another regarding a high frequency. This makes it possible to suppress capacitive variation induced by a high-frequency signal. As a result, a high-frequency electronic component employing the variable capacitance capacitor suffers little from intermodulation distortion while offering excellent power handling capability.

In the invention, it is preferable that the plurality of variable capacitance elements are classified under two groups: a variable capacitance element group A consisting of variable capacitance elements where the first bias line is connected relatively to the input terminal side electrode thereof, and a variable capacitance element group B consisting of variable capacitance elements where the first bias line is connected relatively to the output terminal side electrode thereof, and that the variable capacitance element groups A and B have a substantially equal capacitance value.

According to the invention, the plurality of the variable capacitance elements are classified under two groups: a variable capacitance element group A consisting of the variable capacitance elements where the first bias line is connected relatively to the input terminal side electrode thereof, and a variable capacitance element group B consisting of the variable capacitance elements where the first bias line is connected relatively to the output terminal side electrode thereof. The variable capacitance element groups A and B have a substantially equal capacitance value. In this case, even if the capacitances of the individual variable capacitance elements are caused to vary in accompaniment with application of a high-frequency voltage, since direct current bias voltages of opposite polarity are applied to the variable capacitance element constituting the variable capacitance element group A and the variable capacitance element constituting the variable capacitance element group B, respectively, it follows that the influence of the capacitive variation induced by the high-frequency voltage can be canceled out between the variable capacitance element constituting the variable capacitance element group A and the variable capacitance element constituting the variable capacitance element group B. This makes it possible to reduce further the high-frequency signal-induced capacitance value variation in the variable capacitance capacitor as a whole. As a result, in the case of employing the variable capacitance capacitor as a high-frequency electronic component, high-frequency signal-related distortion such as waveform distortion or intermodulation distortion can be minimized successfully.

In the invention, it is preferable that the plurality of variable capacitance elements are constituted by an even number of variable capacitance elements.

According to the invention, the plurality of variable capacitance elements are constituted by an even number of variable capacitance elements. In this case, although direct current bias voltages applied to the individual variable capacitance elements differ from one another in direction, since the plurality of the variable capacitance elements are constituted by an even number of variable capacitance elements, it follows that the influence of the difference in direction among the direct current bias voltages can be canceled out between the adjacent variable capacitance elements, thereby canceling out polarity with respect to the bias signal. As a result, it is no longer necessary to pay attention to polarity when setting up the variable capacitance capacitor, thus attaining enhanced handleability.

In the invention, it is preferable that the variable capacitance element group A and the variable capacitance element group B are constituted by a pair of the variable capacitance elements having a substantially equal capacitance value.

According to the invention, the variable capacitance element group A and the variable capacitance element group B are constituted by a pair of the variable capacitance elements having a substantially equal capacitance value. In this case, even if the capacitances of the individual variable capacitance elements are caused to vary in accompaniment with application of a high-frequency voltage, since direct current bias voltages of opposite polarity are applied to the variable capacitance element constituting the variable capacitance element group A and the variable capacitance element constituting the variable capacitance element group B respectively, it follows that the influence of the capacitive variation can be canceled out by the pair of the variable capacitance elements having a substantially equal capacitance value among the variable capacitance element constituting the variable capacitance element group A and the variable capacitance element constituting the variable capacitance element group B. This makes it possible to reduce further the high-frequency signal-induced capacitance value variation in the variable capacitance capacitor as a whole. As a result, in the case of employing the variable capacitance capacitor as a high-frequency electronic component, high-frequency signal-related distortion such as waveform distortion or intermodulation distortion can be minimized successfully.

In the invention, it is preferable that the plurality of the variable capacitance elements have a substantially equal capacitance value.

According to the invention, the plurality of the variable capacitance elements have a substantially equal capacitance value. Thus, any given variable capacitance element of the variable capacitance element group A and any given variable capacitance element of the variable capacitance element group B are made to have the substantially equal capacitance value. In this case, even if the capacitances of the individual variable capacitance elements are caused to vary in accompaniment with application of a high-frequency voltage, since direct current bias voltages of opposite polarity are applied to the variable capacitance element groups A and B respectively, it follows that the influence of the capacitive variation can be canceled out between the pair of the variable capacitance elements having the essentially equal capacitance value in the variable capacitance element groups A and B. This makes it possible to reduce further the high-frequency signal-induced capacitance value variation in the variable capacitance capacitor as a whole. As a result, in the case of employing the variable capacitance capacitor as a high-frequency electronic component, high-frequency signal-related distortion such as waveform distortion or intermodulation distortion can be minimized successfully. In addition, the variable capacitance capacitor is formed of the identical variable capacitance elements. This makes easier the production of the variable capacitance capacitor, in contrast to a case where the variable capacitance elements are designed differently from one another.

In the invention, it is preferable that the plurality of the variable capacitance elements are constituted by an odd number of variable capacitance elements.

According to the invention, the plurality of the variable capacitance elements are constituted by an odd number of variable capacitance elements. In this case, it is possible to achieve commonality among the input and output terminals acting as signal terminals for supplying a high-frequency signal and the bias terminals for supplying a bias signal to which the first and second bias lines are connected. As a result, the variable capacitance capacitor has a high degree of flexibility in mounting and in pattern design, and is thus easy to handle.

In the invention, it is preferable that the variable capacitance element connected to the input terminal and the variable capacitance element connected to the output terminal, have a capacitance value larger than the other variable capacitance elements.

According to the invention, the variable capacitance element connected to the input terminal and the variable capacitance element connected to the output terminal, have a capacitance value larger than the other variable capacitance elements. In this case, the capacitance value of the variable capacitance element connected to the input terminal and the capacitance value of the variable capacitance element connected to the output terminal are greater than the value of a stray capacitance that appears across the input terminal and the variable capacitance element connected to the input terminal and the value of a stray capacitance that appears across the output terminal and the variable capacitance element connected to the output terminal, respectively. This makes it possible to reduce the influence of the stray capacitance upon the capacitance values for the variable capacitance elements connected to the input terminal and the output terminal, respectively. More specifically, because of the serial connection of the variable capacitance elements, the capacitance value of the variable capacitance capacitor is an inverse number of the sum total of inverse numbers of the capacitance values for all the variable capacitance elements. Since the capacitance value of the variable capacitance element connected to the input terminal, as well as the capacitance value of the variable capacitance element connected to the output terminal, is less responsible for the capacitance value of the variable capacitance capacitor than the capacitance value of the other variable capacitance element, it follows that the influence of the stray capacitance can be minimized, whereby making it possible to reduce capacitance value variation among the plurality of variable capacitance capacitors in finished form.

In the invention, it is preferable that the thin-film dielectric layer is made of a perovskite-type oxide crystal containing Ba, Sr, and Ti.

According to the invention, the thin-film dielectric layer is made of a perovskite-type oxide crystal containing Ba, Sr, and Ti. In this case, the thin-film dielectric layer exhibits a higher dielectric constant, resulting in advantages in increasing the capacitive variation rate and in reducing losses.

In the invention, it is preferable that the first and second bias lines are so designed that their impedance is larger than the impedance at each of the variable capacitance elements in a usable frequency region.

According to the invention, the first and second bias lines are so designed that their impedance is larger than the impedance at each of the variable capacitance elements in a usable frequency region. In this case, it never occurs that the signal components present in the usable frequency region leak to the first and second bias lines that will eventually exert adverse effects on the impedance in a high-frequency band.

Furthermore, the invention provides a circuit module comprising the variable capacitance capacitor of the invention mentioned above, used as a capacitor constituting a resonant circuit.

According to the invention, the circuit module comprises the variable capacitance capacitor of the invention mentioned above used as a capacitor constituting a resonant circuit. In this construction, the rate of capacitive variation in the capacitor is sufficiently high and a desired capacitance can be obtained with high accuracy. Thereby, a desired resonant frequency can be obtained in a wider frequency range with high accuracy. Moreover, with the excellence in power handling capability of the capacitor constituting a resonant circuit, the circuit module is excellent in reliability.

Furthermore, the invention provides a communications apparatus comprising the circuit module of the invention, used as filter means.

According to the invention, the communications apparatus comprises the circuit module of the invention used as filter means. In this construction, such a communications apparatus can be realized that a desired resonant frequency can be determined in a wider frequency range with high accuracy, with the result that the filter means is operable in a wider range of frequencies, and is also capable of functioning in a desired manner with high accuracy.

BRIEF DESCRIPTION OF THE DRAWINGS

Other and further objects, features, and advantages of the invention will be more explicit from the following detailed description taken with reference to the drawings wherein.

DETAILED DESCRIPTION OF TEH PREFERRED EMBODIMENTS

Figure 1:
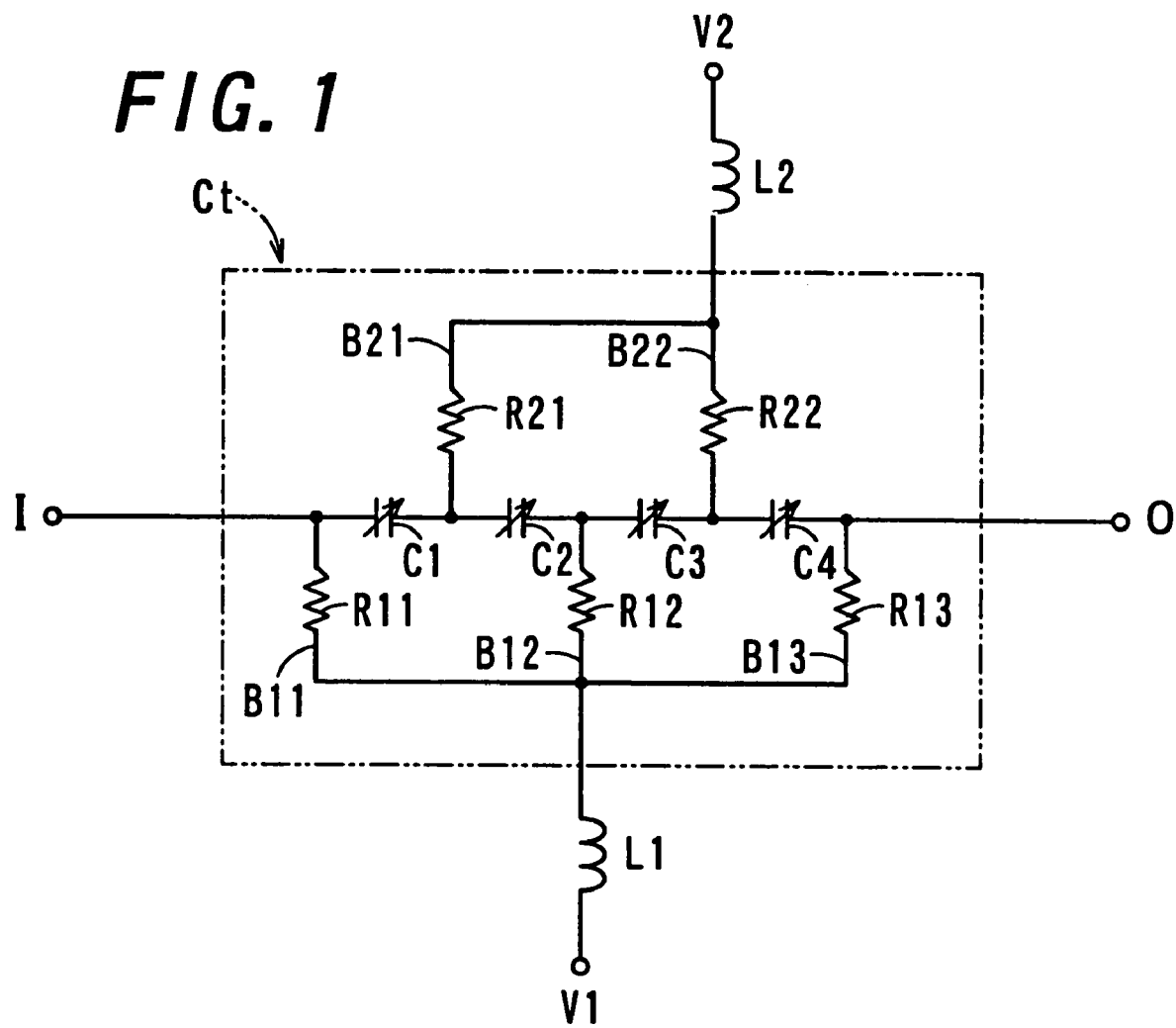
FIG. 1 is an equivalent circuit diagram showing a variable capacitance capacitor according to an embodiment of the invention.

Now referring to the drawings, preferred embodiments of the invention are described below.

Hereinafter, a detailed description will be given as to a variable capacitance capacitor, a circuit module, and a communications apparatus according to the invention with reference to the accompanying drawings.

FIG. 1 is an equivalent circuit diagram showing a variable capacitance capacitor Ct according to an embodiment of the invention. The variable capacitance capacitor of the embodiment has four pieces of variable capacitance elements C1, C2, C3 and C4.

In the equivalent circuit diagram shown in FIG. 1, symbols C1, C2, C3, and C4 each represent a variable capacitance element. Symbols B11, B12, and B13 each represent a first bias line including at least one of a resistance component and an inductance component (in the figure, resistance components R11, R12, and R13 are shown). Symbols B21 and B22 each represent a second bias line including at least one of a resistance component and an inductance component (in the figure, resistance components R21 and R22 are shown). In the variable capacitance capacitor Ct, a plurality of variable capacitance elements C1, C2, C3, and C4 are connected in series with one another between an input terminal I and an output terminal O. The input terminal I constitutes a first high-frequency signal terminal, and the output terminal O constitutes a second high-frequency signal terminal. The variable capacitance elements each employ a thin-film dielectric layer whose dielectric constant is caused to vary with application of a voltage. Moreover, the first bias line and the second bias line included therein are connected, alternately, to an electrode connected to the input terminal I of a variable capacitance element array constituted by the plurality of variable capacitance elements C1, C2, C3 and C4 connected in series, electrodes of the variable capacitance elements C1, C2, C3 and C4 connected with one another, and an electrode connected to the output terminal O of the variable capacitance element array. Further, a first bias terminal V1 is connected to the first bias line by way of an inductance L1, and a second bias terminal V2 is connected to the second bias line by way of an inductance L2. In FIG. 1, the first bias terminal V1 is adjusted to be higher in potential than the second bias terminal V2 (for example, the first and second bias terminals V1 and V2 may be adjusted to exhibit a positive electric potential and a negative electric potential, respectively).

In the embodiment, among the variable capacitance element array, the variable capacitance elements C1 and C3 constitute a variable capacitance element group A where the first bias line is connected relatively to an input terminal I-side electrode thereof, whereas, among the variable capacitance element array, the variable capacitance elements C2 and C4 constitute a variable capacitance element group B where the first bias line is connected relatively to an output terminal O-side electrode thereof.

In the variable capacitance capacitor Ct thus configured, a high-frequency signal is allowed to propagate, by way of the series-connected variable capacitance elements C1, C2, C3, and C4, across the first signal terminal I and the second signal terminal O of the variable capacitance capacitor Ct. At this time, the resistance components R11, R12, and R13 of the first bias lines B11, B12, and B13 and the resistance components R21 and R22 of second bias lines B21 and B22 are so determined as to be larger impedance components relative to the impedance at the variable capacitance elements C1, C2, C3, and C4 in the region of frequencies for a high-frequency signal. This helps prevent a high-frequency signal from leaking to the first bias lines B11, B12, and B13 and the second bias lines B21 and B22, and thus the impedance in a high-frequency band will not be adversely affected.

Moreover, a bias signal for controlling the capacitance component of the variable capacitance element C1 is supplied from the first bias terminal V1 to the variable capacitance element C1 by way of an inductance L1 and the first bias line B11. Then, the bias signal is fed to the second bias terminal V2 by way of the second bias line B21 and an inductance L2. In response to the direct current bias voltage applied to the variable capacitance element C1, the thin-film dielectric layer of the variable capacitance element C1 exhibits a predetermined dielectric constant. As a result, a desired capacitance component can be obtained. Similarly, the variable capacitance elements C2, C3, and C4 are each given a bias signal having the same level regarding a direct current as the bias signal applied to the variable capacitance element C1 on the ground that they are connected in parallel with one another regarding a direct current, by way of the first bias lines B12 and B13 and the second bias lines B21 and B22. In this way, a desired capacitance component can be obtained as well. The inductances L1 and L2 act to prevent occurrence of variation in direct current which is fed from the first and second bias terminals V1 and V2 to the variable capacitance elements C1, C2, C3, and C4. However, it is possible to eliminate the need to prepare inductances L1 and L2 for constitution in FIG. 1.

As a result, for controlling the capacitance of each of the variable capacitance elements C1, C2, C3, and C4 to a desired value, a direct current bias voltage can be supplied to the variable capacitance elements C1, C2, C3, and C4 on an individual basis with stability. This makes it possible to cause the dielectric constant of each thin-film dielectric layer of the variable capacitance elements C1, C2, C3, and C4 to vary to a desired degree through application of a direct current bias signal; wherefore the variable capacitance capacitor Ct will be advantageous in easiness of capacitance-component control.

Moreover, because of the resistance components R11, R12, R13, R21, and R22 behaving as larger impedance components relative to the impedance in the frequency region for the high-frequency signal, it never occurs that a high-frequency signal inputted to the variable capacitance elements C1, C2, C3, and C4 leaks through the first bias lines B11, B12, and B13 and the second bias lines B21 and B22. This also contributes to the above-described merit of allowing the variable capacitance elements C1, C2, C3, and C4 to receive a bias signal on an individual basis with stability. As a result, it is possible to make the most of the rate of bias signal-induced capacitive variation as observed in each of the variable capacitance elements C1, C2, C3, and C4.

That is, in the variable capacitance capacitor Ct, the variable capacitance elements C1, C2, C3, and C4 may be regarded as, high frequency-wise, series-connected variable capacitance elements.

Accordingly, at the time of applying a high-frequency voltage to the series-connected variable capacitance elements C1, C2, C3, and C4, voltage division takes place so that the high-frequency voltage is divided among the variable capacitance elements C1, C2, C3, and C4. After all, the variable capacitance elements C1, C2, C3, and C4 are each given a decreased amount of the high-frequency voltage which is inputted from the input terminal I, whereby making it possible to suppress capacitive variation induced by the high-frequency signal. Thus, in a high-frequency electronic component employing the variable capacitance capacitor, occurrence of distortion such as waveform distortion or intermodulation distortion can be minimized successfully.

As another advantage, by connecting the variable capacitance elements C1, C2, C3, and C4 in series with one another, it is possible to achieve, regarding a high frequency, the same effect as what is achieved by increasing the thickness of the dielectric layer constituting the capacitance element. This helps reduce the extent of heat generation per unit volume ascribable to a loss resistance occurring in the variable capacitance capacitor, and the power handling capability of the variable capacitance capacitor Ct can be improved correspondingly.

As still another advantage, by providing the first bias lines B11, B12, and B13 and the second bias lines B21 and B22, it is possible to supply a bias signal at the first and second bias terminals V1 and V2. This eliminates the need to prepare a bias supply circuit that is mounted, as has been conventional, on an external wiring board independently of the variable capacitance capacitor, and thus helps reduce the size of a circuit board on which the variable capacitance capacitor Ct is mounted and simultaneously enhance the handleability.

As further advantage, the first bias lines B11, B12, and B13 placed on the high-potential side in terms of voltage application, that is; placed on the side of the first bias terminal V1, and the second bias lines B21 and B22 placed on the low-potential side in terms of voltage application, that is; placed on the side of the second bias terminal V2, are connected, alternately, to the electrode connected to the input terminal I of the variable capacitance element array, the electrodes of the variable capacitance elements C1, C2, C3 and C4 connected with one another, and the electrode connected to the output terminal O of the variable capacitance element array. This makes it possible to achieve commonality among the second bias terminal V2-side bias line associated with the variable capacitance elements C1 and C2, the first bias terminal V1-side bias line associated with the variable capacitance elements C2 and C3, and the second bias terminal V2-side bias line associated with the variable capacitance elements C3 and C4. In this way, the number of the bias lines can be reduced, and the bias-line configuration can be simplified correspondingly.

Note that, in the equivalent circuit diagram shown in FIG. 1, the second bias terminal V2 may be connected to ground. In this case, the inductance L2 is no longer necessary.

It is preferable that the capacitance value of the variable capacitance element group A is substantially equal to that of the variable capacitance element group B. In other words, it is preferable that the sum total of the capacitance values for variable capacitance elements constituting the variable capacitance element group A, is substantially equal to the sum total of the capacitance value for variable capacitance elements constituting the variable capacitance element group B. The reason therefor will be explained below with reference to FIGS. 2, 3A, and 3B.

Figure 2:
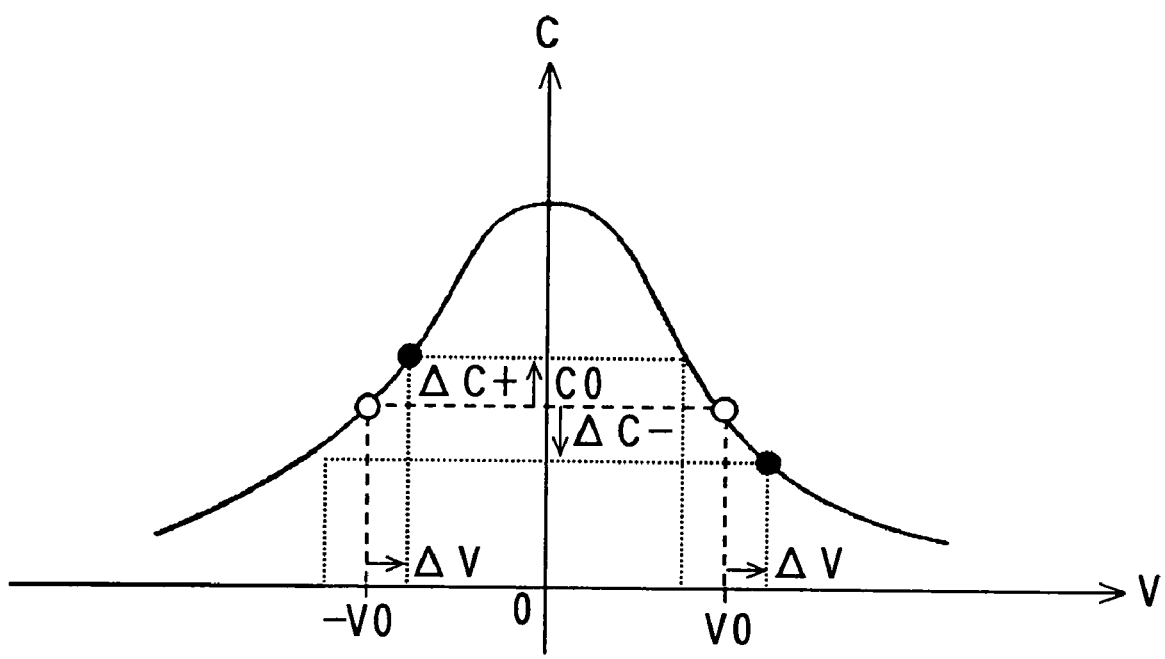
FIG. 2 is a diagram showing one example of direct current bias voltage characteristics of a capacitive variation rate in the variable capacitance capacitor.

FIG. 2 is a diagram showing the dependence of a capacitive variation rate on a voltage to be applied as observed in the variable capacitance elements C1, C2, C3, and C4. In FIG. 2, a voltage to be applied is taken along the horizontal axis (unit: V) and a capacitive variation rate is taken along the vertical axis (unit: %) In the figure, an open circle "○" indicates a state in which a direct current bias voltage is being applied, whereas a solidly shaded circle "●" indicates a state in which, after application of a direct current bias voltage, a high-frequency voltage is applied in superposed relation with the direct current bias voltage.

Figure 3A:
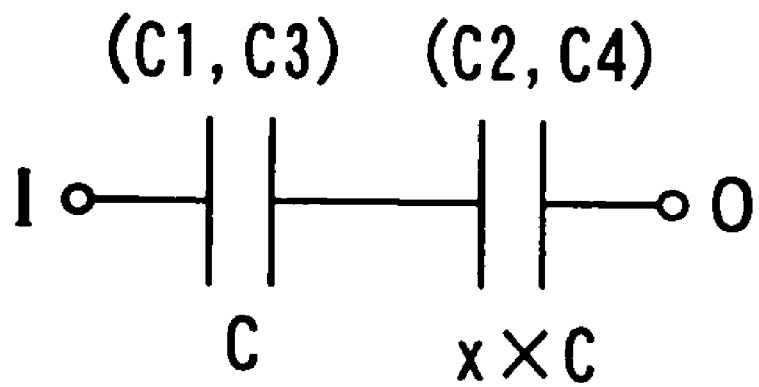
FIGS. 3A and 3B are conceptual drawings each showing a high frequency-wise connection of a variable capacitance element in the variable capacitance capacitor.
Figure 3B:
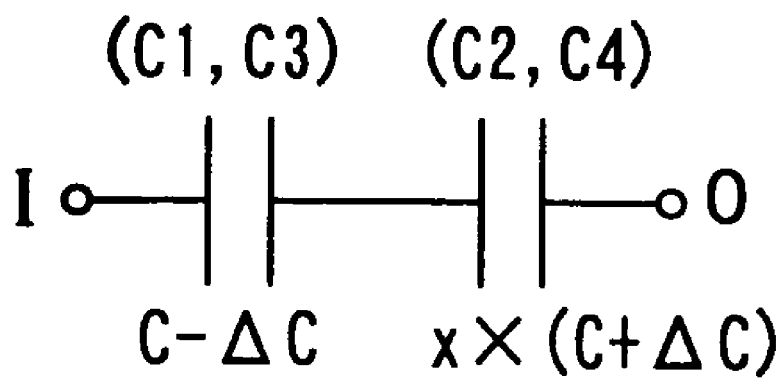

FIGS. 3A and 3B are conceptual drawings showing the high frequency-wise connection of the variable capacitance elements C1, C2, C3, and C4 in the variable capacitance capacitor Ct shown in FIG. 1. In these figures, the variable capacitance elements C1 and C3 are put together as the variable capacitance element group A, and the variable capacitance elements C2 and C4 are put together as the variable capacitance element group B.

In FIG. 3A, under the condition that a direct current bias voltage is applied, the total capacitance value of the variable capacitance elements C1, C2 which compose element group A is given as C, and the total capacitance value of the variable capacitance elements C3, C4 which compose element group B is set to be x times as large as the total capacitance value C, that is; given as x×C. The value x is larger than 0.

FIG. 3B shows, under the condition that a direct current bias voltage is applied, how the total capacitance values of the variable capacitance elements C1, C2 which compose element group A and the variable capacitance elements C3, C4 which compose element group B are caused to vary in accompaniment with application of a high-frequency voltage.

Referring to FIG. 2, it is assumed that a high-frequency voltage is applied to the variable capacitance elements C1, C2, C3, and C4 to which a direct current bias voltage has already been applied. Given the phase of the high-frequency signal of a positive potential, when the direct current bias voltage is of a positive potential, that is, when the input terminal I-side electrode has a higher potential than the output terminal O-side electrode in the variable capacitance elements C1, C2, C3, and C4, the variable capacitance elements C1, C2, C3, and C4 actually receive a bias voltage of higher level due to the application of the high-frequency voltage. As a result, as compared with the case of applying the direct current bias voltage alone, the capacitance value is decreased. By way of contrast, when the direct current bias voltage is of a negative potential, that is, when the first signal terminal I-side electrode has a lower potential than the second signal terminal O-side electrode in the variable capacitance elements C1, C2, C3, and C4, the variable capacitance elements C1, C2, C3, and C4 actually receive a direct current bias voltage of lower level due to the application of the high-frequency voltage. As a result, as compared with the case of applying the direct current bias voltage alone, the capacitance value is increased. In other words, even if the direct current bias voltages to be applied have a common absolute value, depending upon their polarity, the capacitance values of the variable capacitance elements C1, C2, C3, and C4 vary. Note that shown in FIG. 2 is the dependence of a capacitive variation rate on a voltage to be applied as observed in the variable capacitance elements C1, C2, C3, and C4. Thus, the variable capacitance elements C1, C2, C3, and C4 differ in capacitive variation rate from one another according to the capacitances of their own.

In the variable capacitance capacitor Ct, with respect to each variable capacitance element C1, C3 of the variable capacitance element group A, the first bias lines B11 and B12 of higher potential are connected relatively to the first signal terminal I-side electrode, and, with respect to each variable capacitance element C2, C4 of the variable capacitance element group B, the first bias lines B12 and B13 of higher potential are connected relatively to the second signal terminal O-side electrode. Thus, the first bias terminal V1 exhibits a positive potential, whereas the second bias terminal V2 exhibits a negative potential. When viewed from the high-frequency signal first signal terminal I, a positive-potential direct current bias voltage is applied to each variable capacitance element C1, C3 of the variable capacitance element group A, and a negative-potential direct current bias voltage is applied to each variable capacitance element C2, C4 of the variable capacitance element group B. In consequence, each variable capacitance element C1, C3 of the variable capacitance element group A is subjected to a bias voltage of higher level, and correspondingly the total capacitance value C thereof is reduced to a value of C−ΔC. On the other hand, each variable capacitance element C2, C4 of the variable capacitance element group B is subjected to a bias voltage of lower level, and correspondingly the total capacitance value x×C thereof grows to a value of x×(C+ΔC). By way of contrast, given the phase of the high-frequency signal of a negative potential, then the total capacitance value of each variable capacitance element C1, C3 of the variable capacitance element group A is given as C+ΔC, whereas the total capacitance value of each variable capacitance element C2, C4 of the variable capacitance element group B is given as x×(C−ΔC).

Herein, ΔC represents an amount of high-frequency signal-induced capacitive variation as observed in the variable capacitance element group A, which is based on the total capacitance value C of each variable capacitance element C1, C3 of the variable capacitance element group A. Note that, as shown in FIG. 2, the dependence of a capacitive variation rate on a voltage to be applied as observed in the variable capacitance elements C1, C2, C3, and C4 is not expressed in a linear functional relationship with respect to both regions of the positive and negative regions. Thus, strictly speaking, although the absolute value of the amount of high-frequency voltage-induced capacitive variation ΔC differs according to whether a direct current bias voltage to be applied is positive or negative, yet it can be regarded as being expressed in a linear function practically.

Referring to Table 1, the sum total C of the capacitance values of the variable capacitance elements C1 and C3 of the variable capacitance element group A as observed when a direct current bias voltage is applied is set at 2.5 pF, and the amount of high-frequency signal-induced capacitive variation ΔC in the variable capacitance element group A is set at 0.625 pF, which accounts for 25% of the sum total C of the capacitance values of the variable capacitance elements C1 and C3 of the variable capacitance element group A as observed when a direct current bias voltage is applied. Under these conditions, the following calculation results are obtained and listed in Table 1: the total sum C of the capacitance values of variable capacitance elements C1 and C3 of the variable capacitance element group A and the sum total x×C of the capacitance values of the variable capacitance elements C2 and C4 of the variable capacitance element group B as observed when a direct current bias voltage is applied, namely, a capacitance value $C_T$ of the variable capacitance capacitor Ct as observed when a direct current bias voltage is applied; capacitance values $C_T+$ and $C_T-$ of the variable capacitance capacitor Ct as observed when a high-frequency signal is applied in superposed relation with the already-applied direct current bias voltage, of which $C_T+$ corresponds to a case where the phase of the high-frequency signal is a positive potential, and $C_T-$ corresponds to a case where the phase of the high-frequency signal is a negative potential; and the rate of capacitive variation $C_T+/C_T$, $C_T-/C_T$ observed in the variable capacitance capacitor Ct when a high-frequency signal is applied in superposed relation with the already-applied direct current bias voltage. The rate of capacitive variation $C_T+/C_T$, $C_T-/C_T$ observed in the variable capacitance capacitor Ct is shown in percentage.

TABLE 1

| x | ΔC (pF) | C (pF) | $C_T$ (pF) | $C_T+$ (pF) | $C_T-$ (pF) | $C_T+/C_T$ (%) | $C_T-/C_T$ (%) |
|---|---|---|---|---|---|---|---|
| 1.0 | 0.625 | 2.5 | 1.25 | 1.17 | 1.17 | 93.8 | 93.8 |
| 1.2 | 0.625 | 2.5 | 1.36 | 1.25 | 1.31 | 91.7 | 95.9 |
| 1.4 | 0.625 | 2.5 | 1.46 | 1.31 | 1.43 | 90.0 | 97.8 |
| 1.6 | 0.625 | 2.5 | 1.54 | 1.36 | 1.53 | 88.6 | 99.5 |
| 1.8 | 0.625 | 2.5 | 1.61 | 1.41 | 1.62 | 87.5 | 101.0 |
| 2.0 | 0.625 | 2.5 | 1.67 | 1.44 | 1.70 | 86.5 | 102.3 |

As will be understood from Table 1, in a case where x=1.0, that is; where the variable capacitance element group A and the variable capacitance element group B are equal in capacitance value, the capacitance value $C_T+$ and the capacitance value $C_T-$ of the variable capacitance capacitor Ct are equal, which are obtained when a high-frequency signal is applied in superposed relation with the already-applied direct current bias voltage. However, the larger the value x, that is; the greater the difference in capacitance value between the variable capacitance element group A and the variable capacitance element group B, the greater the difference between the capacitance value $C_T+$ and the capacitance value $C_T-$ ascribable to the phase difference in the high-frequency signal. Eventually, in a case where x=1.6, on a percentage basis, a 10% difference is observed as to a capacitive variation rate with respect to the capacitance value C of the variable capacitance capacitor Ct. The variable capacitance element group A and the variable capacitance element group B are assumed to have substantially equal capacitance value under the condition that the difference in capacitive variation rate with respect to the capacitance value $C_T$ of the variable capacitance capacitor Ct between the capacitance value $C_T+$ and the capacitance value $C_T-$ resulting from the phase difference of the high-frequency signal, namely, the variation-rate difference given by the expression: $|\{(C_T+/C_T)-(C_T-/C_T)\}|\times 100$ (%), to be specific, a value obtained by multiplying the absolute value for the expression: $\{(C_T+/C_T)-(C_T-/C_T)\}$ by 100, falls within 10%.

Thus, in a case where the variable capacitance element group A and the variable capacitance element group B differ in capacitance value from each other, the variable capacitance capacitor Ct behaves as a capacitor whose capacitance varies according to the phase of a high-frequency signal. As a result, in a high-frequency electronic component employing such a capacitor, distortion such as waveform distortion or intermodulation distortion appears in a high-frequency signal. Such waveform distortion and intermodulation distortion as occurs in a high-frequency electronic component can be minimized by adjusting the variable capacitance element group A and the variable capacitance element group B to have substantially the same total capacitance value, namely to have substantially equal total capacitance value.

Moreover, it is advantageous that the plurality of variable capacitance elements are constituted by an even number of variable capacitance elements (four pieces, in this example). In this case, as shown in FIG. 1, whether a high-frequency signal is received at the signal terminal I or received at the signal terminal O, the way a bias signal acts upon remains the same. Specifically, although direct current bias voltages applied to the individual variable capacitance elements differ from one another in direction alternately, since an even number of the variable capacitance elements are connected, it follows that the influence of the difference in direction among the direct current bias voltages can be canceled out between the adjacent variable capacitance elements, thereby canceling out polarity with respect to the bias signal. As a result, it is no longer necessary to pay attention to polarity when setting up the variable capacitance capacitor, thus attaining enhanced handleability.

It is also advantageous that the variable capacitance elements C1 and C3 of the variable capacitance element group A and the variable capacitance elements C2 and C4 of the variable capacitance element group B are essentially disposed in paired relationship in terms of capacitance value, that is, the variable capacitance element group A and the variable capacitance element group B are constituted by a pair of the variable capacitance elements having a substantially equal capacitance value. More specifically, for example, assuming that with respect to the variable capacitance element group A, the capacitance value of the variable capacitance element C1 is 4 pF and the capacitance value of the variable capacitance element C3 is 2 pF, whereas, with respect to the variable capacitance element group B, the capacitance value of the variable capacitance element C2 is 2 pF and the capacitance value of the variable capacitance element C4 is 4 pF, then the same number of the variable capacitance elements having the identical capacitance value are included in the respective variable capacitance element groups. In the variable capacitance elements disposed in paired relationship, assume that $C_p$ indicates a capacitance value as observed when a bias voltage is applied, and that $C_p+$ and $C_p-$ indicate two capacitance values as observed when a high-frequency signal is applied in superposed relation with the already-applied direct current bias voltage, respectively, wherein $C_p+$ indicates a capacitance value in a case where the phase of the high-frequency signal is a positive potential, and $C_p-$ indicates a capacitance value in a case where the phase of the high-frequency signal is a negative potential. In this case, the variable capacitance elements disposed in paired relationship are assumed to be substantially equal in capacitance value under the condition that a value given by the expression: $|\{(C_p+/C_p)-(C_p-/C_p)\}|\times 100$ (%), namely, a value obtained by multiplying the absolute value for the expression: $\{(C_p+/C_p)-(C_p-/C_p)\}$ by 100, falls within 10%.

In the variable capacitance capacitor Ct thus configured, even if the capacitances of the individual variable capacitance elements are caused to vary in accompaniment with application of a high-frequency signal in superposed relation with a direct current bias voltage, since direct current bias voltages of opposite polarity are applied respectively to the variable capacitance element groups A and B, it follows that the influence of the capacitive variation can be canceled out between the variable capacitance element of the variable capacitance element group A and the variable capacitance element of the variable capacitance element group B disposed essentially in paired relationship in terms of capacitance value. This makes it possible to reduce further the variation in capacitance value of the variable capacitance capacitor Ct as a whole caused by applying a high-frequency signal in superposed relation with a direct current bias voltage. As a result, high-frequency signal-related distortion such as waveform distortion or intermodulation distortion can be minimized in the high-frequency electronic component.

Further, it is also advantageous that the variable capacitance elements C1, C2, C3, and C4 are substantially equal in capacitance value. For example, assuming that the variable capacitance elements are each given a capacitance value of 2.6 pF, then they have substantially the same capacitive-variation absolute value in all variable capacitance elements. Thereby, the influence of the capacitive variation can be canceled out between any given variable capacitance element of the variable capacitance element group A and any given variable capacitance element of the variable capacitance element group B. This makes it possible to reduce further the variation in capacitance value of the variable capacitance capacitor Ct as a whole caused by applying a high-frequency signal in superposed relation with a direct current bias voltage. As a result, high-frequency signal-related distortion such as waveform distortion or intermodulation distortion can be minimized in the high-frequency electronic component. The variation of each capacitance value of the variable capacitance elements C1, C2, C3 and C4 is made to fall within 10%, whereby the capacitance value of the variable capacitance elements C1, C2, C3 and C4 can be substantially equal.

Figure 4A:
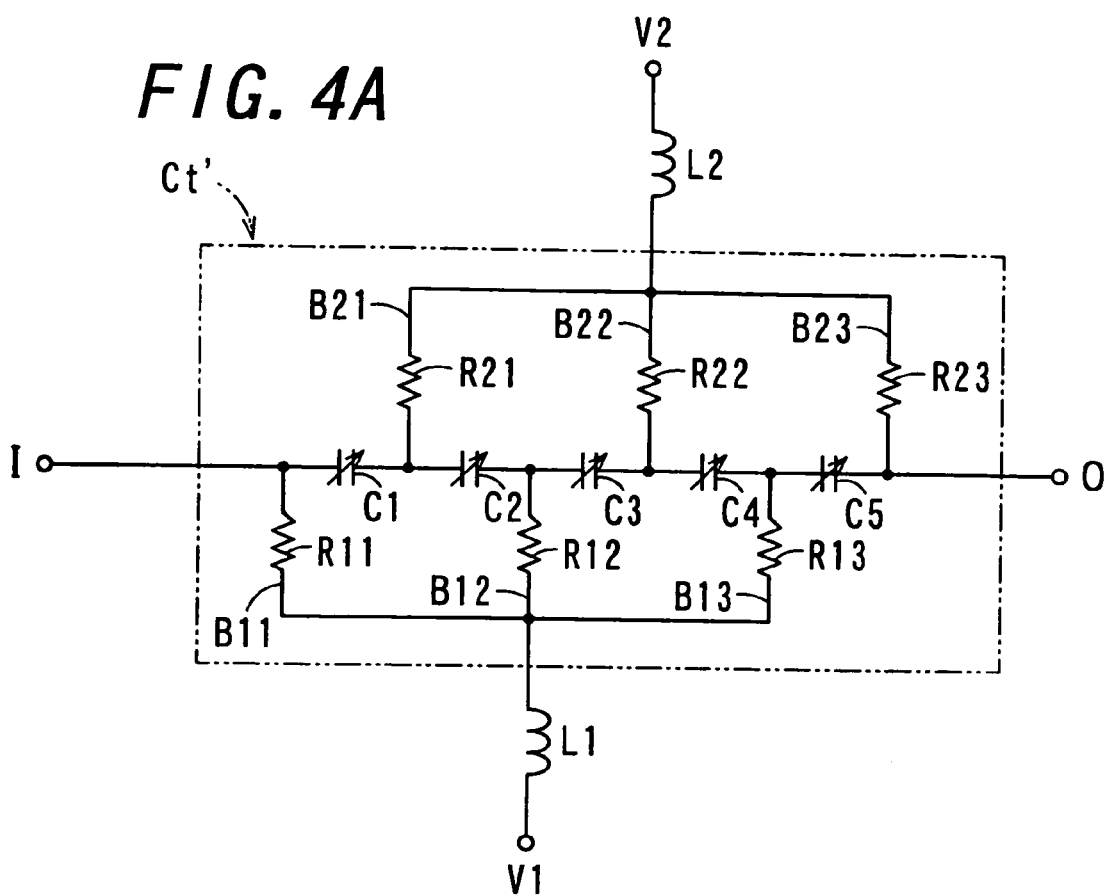
FIGS. 4A and 4B are equivalent circuit diagrams each showing a variable capacitance capacitor according to another embodiment of the invention.
Figure 4B:
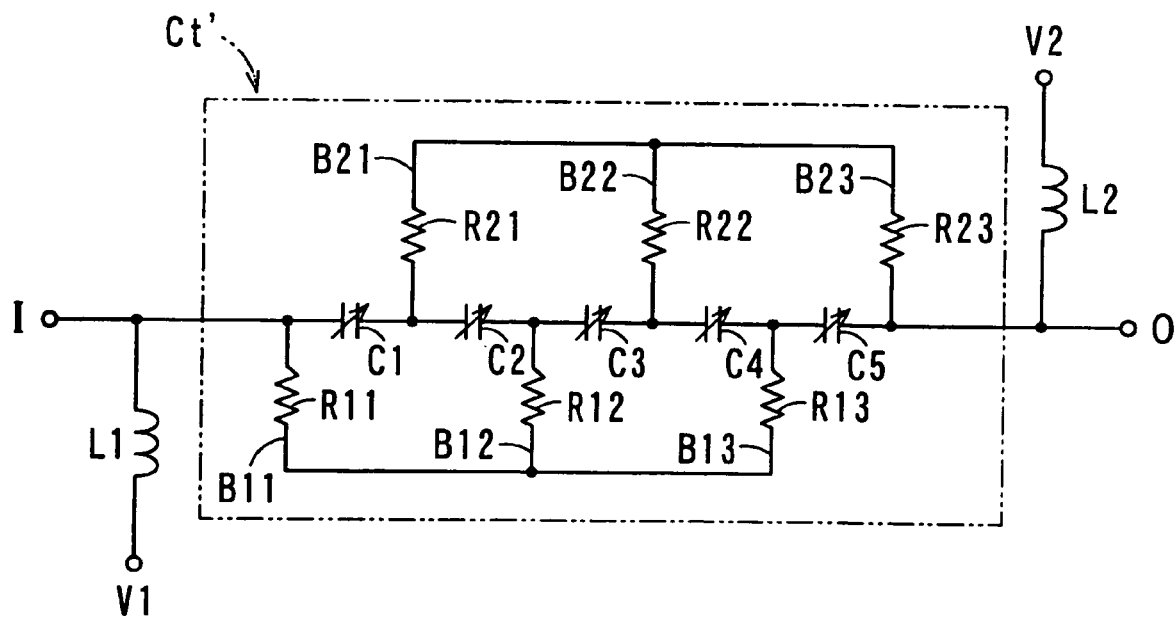

Moreover, the variable capacitance capacitor Ct' according to another embodiment of the invention has basically the same circuit configuration as the variable capacitance capacitor Ct shown in FIG. 1 as shown in the equivalent circuit diagrams respectively depicted in FIGS. 4A and 4B and may have a plurality of variable capacitance elements constituted by an odd number of variable capacitance elements. Here variable capacitance elements comprise five pieces of variable capacitance elements. In these figures, the constituent components that play the same or corresponding roles as in FIG. 1 will be denoted by the same reference symbols, and overlapping descriptions will thereof be occasionally omitted.

Referring to FIGS. 4A and 4B, the first bias lines B11, B12, and B13 and the second bias lines B21, B22, and B23 are provided to apply a direct current bias voltage to each of the variable capacitance elements C1 through C5. In the variable capacitance capacitor Ct' thus configured, as shown in FIG. 4A, the signal terminals I and O and the first and second bias terminals V1 and V2 may be arranged independently of each other. Alternatively, as shown in FIG. 4B, the first bias terminal V1 and the input terminal I may be formed in a common group, and likewise the second bias terminal V2 and the output terminal O may also be formed in a common group. Thus, the variable capacitance capacitor Ct' can be handled in the same way an ordinary capacitor is handled. As a result, the variable capacitance capacitor Ct' can achieve the same effect as the above-mentioned variable capacitance capacitor Ct. Furthermore, the variable capacitance capacitor Ct' has a high degree of flexibility in mounting and in pattern design, and is thus easy to handle.

Moreover, the variable capacitance element C1 connected to the input terminal I and the variable capacitance element C4 connected to the output terminal O in the variable capacitance capacitor Ct, as well as the variable capacitance element C1 connected to the input terminal I and the variable capacitance element C5 connected to the output terminal O in the variable capacitance capacitor Ct', should preferably be made larger in capacitance value than the other variable capacitance elements. By making larger the capacitance value of the variable capacitance element C1 connected to the input terminal I and the capacitance value of the variable capacitance element C4 or C5 connected to the output terminal O than the value of a stray capacitance that appears across the input terminal I and the variable capacitance element C1 connected to the input terminal I and the value of a stray capacitance that appears across the output terminal O and the variable capacitance element C4 or C5 connected to the output terminal O, respectively, it is possible to minimize the influence of the stray capacitance, and thereby reduce undesirable variation in the capacitance value of the variable capacitance capacitor Ct, Ct'.

Next, an explanation will be given as to an example of a method for producing the variable capacitance capacitor Ct embodying the invention.

Figure 5:
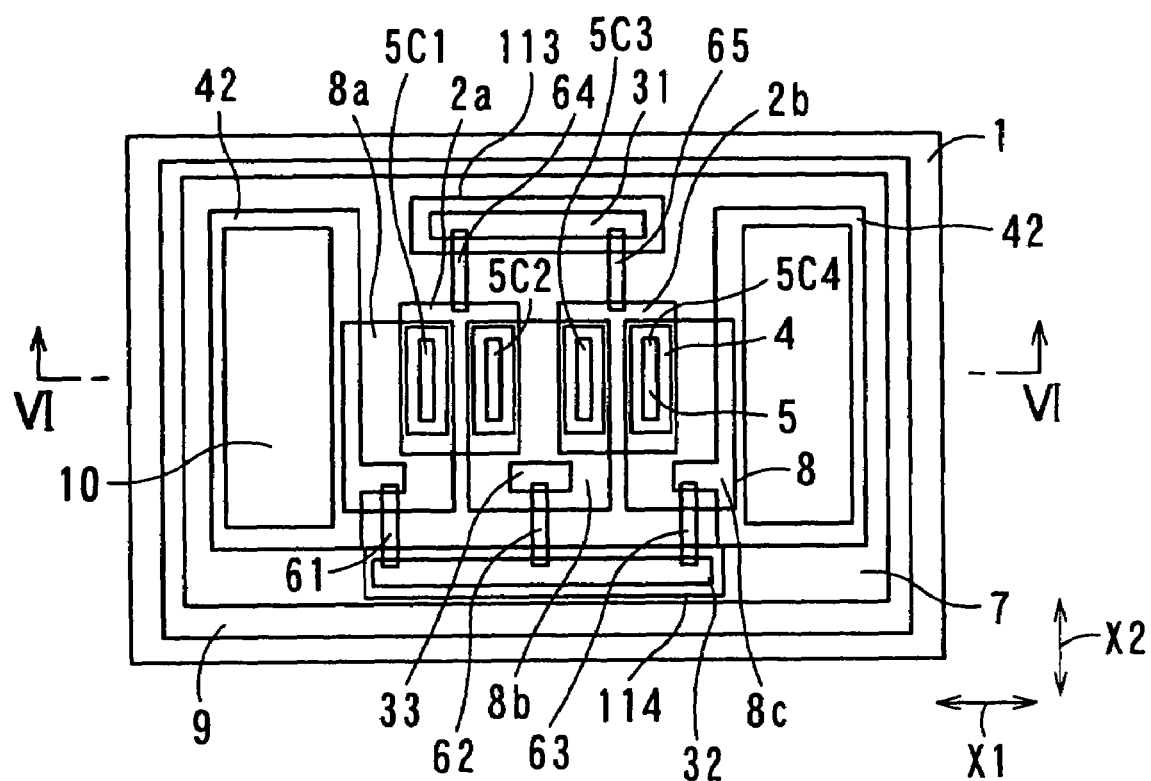
FIG. 5 is a plan view showing in a sight-through state an example of the variable capacitance capacitor shown in FIG. 1.
Figure 6:
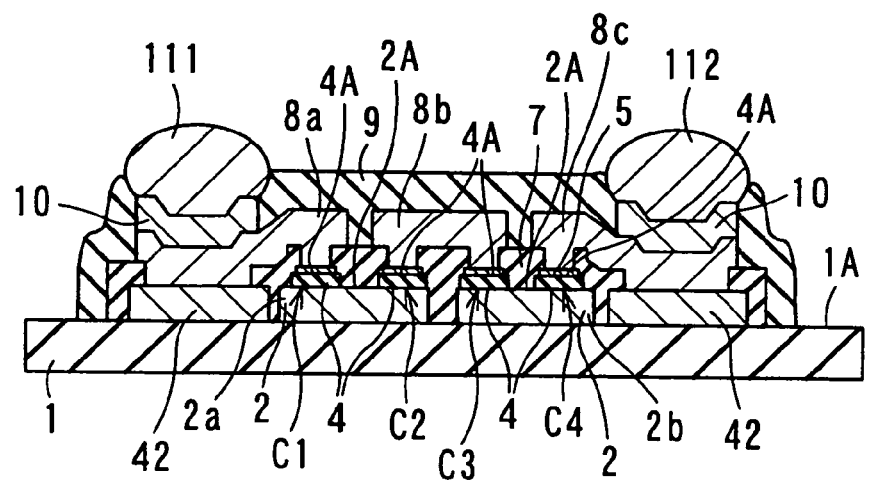
FIG. 6 is a sectional view of the variable capacitance capacitor taken along line VI—VI of FIG. 5.

FIG. 5 is a plan view showing in a sight-through state an example of the variable capacitance capacitor Ct having four pieces of variable capacitance elements C1 through C4 according to the invention. FIG. 6 is a view of the variable capacitance capacitor Ct taken along line VI—VI of FIG. 5.

In FIGS. 5 and 6, reference numeral 1 represents a supporting substrate; reference numeral 2 represents a lower electrode layer; reference numerals 31, 32, and 33 each represent a conductor line; reference numeral 4 represents a thin-film dielectric layer; reference numeral 5 represents an upper electrode layer; reference numerals 61, 62, 63, and 64, and 65 each represent a thin-film resistor; reference numeral 7 represents an insulating layer; reference numeral 8 represents an extraction electrode layer; reference numeral 9 represents a protective layer; reference numeral 10 represents a solder diffusion inhibiting layer; and reference numerals 111, 112, 113, and 114 each represent a solder connection portion. With the solder diffusion inhibiting layer 10, the solder connection portions 111 and 112 constitute the first signal terminal (input terminal) I and the second signal terminal (output terminal) O, respectively. Moreover, with the solder diffusion inhibiting layer 10, the solder connection portions 114 and 113 constitute the first bias terminal V1 and second bias terminal V2, respectively. The inductances L1 and L2 are connected to the solder connection portions 113 and 114, respectively.

The supporting substrate 1 is composed of a ceramic substrate such as an alumina-ceramic substrate or a monocrystalline substrate such as a sapphire substrate. On substantially the entire surface of one thicknesswise surface 1A of the supporting substrate 1 are formed the lower electrode layer 2, the thin-film dielectric layer 4, and the upper electrode layer 5 one after another in the order named. Upon completion of the layer formation, the upper electrode layer 5, the thin-film dielectric layer 4, and the lower electrode layer 2 are subjected to an etching process one after another in the order named to define a predetermined pattern therein.

In forming the lower electrode layer 2, the thin-film dielectric layer 4, and the upper electrode layer 5, there is a possibility that impurities such as particles find their way into the region between the lower electrode layer 2 and the thin-film dielectric layer 4, as well as the region between the thin-film dielectric layer 4 and the upper electrode layer 5. Preferably, it is necessary to see to it that intrusion of such impurities is kept at a minimum to prevent the characteristics of the variable capacitance capacitor from deteriorating. Accordingly, the lower electrode layer 2, the thin-film dielectric layer 4, and the upper electrode layer 5 should preferably be formed continuously in the same coating apparatus, with its coating chamber kept closed to atmosphere. As a suitable layer-formation technique, a sputtering method serves the purpose.

A high-temperature sputtering process is required for forming the thin-film dielectric layer 4. Therefore, the lower electrode layer 2 must be made of a material having a high melting point so as to withstand a high-temperature condition. To be specific, a metal material such as Pt or Pd is suitable for use. The lower electrode layer 2 is also formed through a high-temperature sputtering process. The lower electrode layer 2 is, after taking shape in the high-temperature sputtering process, heated at a temperature ranging from 700 to 900° C., which corresponds to a sputtering temperature for the thin-film dielectric layer 4. Then, the lower electrode layer 2 is left standing for a predetermined period of time until a subsequent sputtering process is started to form the thin-film dielectric layer 4.

With consideration given to the resistance component across the variable capacitance elements C1 and C2, the resistance component across the variable capacitance elements C3 and C4, and the continuity of the lower electrode layer 2, the lower electrode layer 2 should preferably be made thick. However, with consideration given to the adherability between the lower electrode layer 2 and the supporting substrate 1, the lower electrode layer 2 should preferably be made thin relatively. In the end, the thickness of the lower electrode layer 2 is so determined as to reach an excellent compromise between these factors. To be specific, the thickness of the lower electrode layer 2 is selected within 0.1 to 10 μm. If the thickness of the lower electrode layer 2 is less than 0.1 μm, the resistance of the lower electrode layer 2 itself will be undesirably increased, and also satisfactory continuity cannot be attained in the lower electrode layer 2. By way of contrast, if the thickness exceeds 10 μm, an internal stress is increased, which results in the adherability with the supporting substrate 1 being decreased, and in the supporting substrate 1 suffering from warping.

The thin-film dielectric layer 4 should preferably be designed to have a high dielectric constant with use of a perovskite-type oxide crystal which contains at least Ba, Sr, and Ti. As the perovskite-type oxide, for example, it is possible to use barium strontium titanate $((Ba_x Sr_{1-x}) TiO_3)$ or barium strontium titanate $((Ba_x Sr_{1-x}) TiO_3)$ doped with at least one of Mn, Mg, La, and W. The thin-film dielectric layer 4 is formed on the surface (top surface) of the lower electrode layer 2. For example, as a target, a dielectric material which lends itself to obtaining a perovskite-type oxide crystal is subjected to a sputtering process so as to obtain a predetermined thickness. At this time, by performing high-temperature sputtering while maintaining the substrate at a high temperature, for example, at 800° C., it is possible to eliminate the need to carry out a heat treatment subsequent to the sputtering process. As a result, a low-loss thin-film dielectric layer 4 can be realized that exhibits a high dielectric constant and a great capacitive variation rate.

As a material for forming the upper electrode layer 5, it is desirable to use Au having a low resistivity in order to keep the resistance of the layer at a lower level. From the viewpoint of enhancing the adherability with the thin-film dielectric layer 4, it is desirable to use Pt or the like material as an adhesive layer. The thickness of the upper electrode layer 5 is selected in a range from 0.1 to 10 μm. The lower limit of the thickness of the upper electrode layer 5 is, just as is the case with the lower electrode layer 2, determined in consideration of the resistance and continuity of the upper electrode layer 5 itself. On the other hand, the upper limit of the thickness of the upper electrode layer 5 is determined in consideration of the adherability with the thin-film dielectric layer 4.

Upon completion of the layer formation, the upper electrode layer 5, the thin-film dielectric layer 4, and the lower electrode layer 2 are subjected to an etching process one after another in the order named to define a predetermined pattern therein. In the etching process, a resist is coated onto the entire surface of the layer by means of the spin coating or the like method, and, after patterning is performed to define a predetermined pattern in the resist by means of the photolithography, the layer undergoes wet etching or dry etching. Considering the fact that the capacitance values of the variable capacitance elements C1 through C4 depend on the area of the upper electrode layer 5, it is desirable that the upper electrode layer 5 be etched by means of dry etching from an accuracy standpoint.

The dry etching process can be accomplished with an electron cyclotron resonance (ECR) apparatus, using argon plasma as an etchant.

The thin-film dielectric layer 4 may be etched by means of either wet etching or dry etching.

Also, the lower electrode layer 2 may be etched by means of either wet etching or dry etching. However, in a case where the lower electrode layer 2 is made thick, just as is the case with the upper electrode layer 5, it is desirable to adopt dry etching from a patterning accuracy standpoint.

In the variable capacitance elements C1 through C4 formed by etching the upper electrode layer 5, the thin-film dielectric layer 4, and the lower electrode layer 2 as mentioned above, etching is applied in such a way that the lower surface of the thin-film dielectric layer 4, namely the surface of the thin-film dielectric layer 4 facing the lower electrode layer 2 is smaller than the upper surface of the lower electrode layer 2, namely the surface of the lower electrode layer 2 facing the thin-film dielectric layer 4, and that the lower surface of the upper electrode layer 5, namely the surface of the upper electrode layer 5 facing the thin-film dielectric layer 4 is smaller than the upper surface of the thin-film dielectric layer 4, namely the surface of the thin-film dielectric layer 4 facing the upper electrode layer 5. In this way, the lower electrode layer 2 can be free of the thin-film dielectric layer 4 at its outer edge on which an electric field tends to concentrate, whereby the leakage current characteristics are improved. That is, it is possible to prevent occurrence of leak current in the variable capacitance elements C1 through C4.

On one thicknesswise surface 1A of the supporting substrate 1 are arranged the lower electrode layer 2 at a predetermined interval in a direction longitudinally of the supporting substrate 1 (hereafter referred to as "longitudinal direction X"). Herein, two pieces of lower electrode layers 2 are provided. On one thicknesswise surface 2A of each of the lower electrode layers 2 are arranged two pieces of thin-film dielectric layers 4 at a predetermined interval in the longitudinal direction X. On one thicknesswise surface 4A of each of the thin-film dielectric layers 4 is formed the upper electrode layer 5. The lower electrode layers 2 corresponding to the variable capacitance elements C1 through C4 are identically sized, and so are the thin-film dielectric layers 4, the upper electrode layers 5.

In such a manner as described thus far, the variable capacitance elements C1 through C4 are obtained.

In order to establish electric connection between the first signal terminal I and the variable capacitance element C1, as well as between the variable capacitance element C4 and the second signal terminal O, it is preferable to form, using a material possessing electrical conductivity, a conductive layer 42 in part of the supporting substrate's surface in which the first and second signal terminals I and O are arranged. The conductive layer 42 may be formed separately after completing fabrication of the variable capacitance elements C1 through C4, or may be formed in a common process with the lower electrode layer 2, using the same material as that used for the lower electrode layer 2. In the latter case, the conductive layer is formed concurrently with a patterning operation on the lower electrode layer 2. Two pieces of conductive layers 42 are arranged on one end and another end in an arranging direction of a lower electrode layer array composed of the lower electrode layers 2, that is, on one side and another side in the longitudinal direction of the supporting substrate 1, at a predetermined interval from the lower electrode layers 2. On each of the conductive layers 42 is laminated the solder diffusion inhibiting layer 10. One of the solder diffusion inhibiting layers 10 has the solder connection portion 111 laminated thereon constituting the first signal terminal I, whereas the other solder diffusion inhibiting layer 10 has the solder connection portion 112 laminated thereon constituting the second signal terminal O.

The upper electrode layers 5 constituting the variable capacitance elements C1 through C4 are defined as the upper electrode layer portions 5C1 through 5C4, respectively. The upper electrode layer portion 5C1 is connected to the extraction electrode layer 8a, the upper electrode layer portions 5C2 and 5C3 are each connected to the extraction electrode layer 8b, and the upper electrode layer portion 5C4 is connected to the extraction electrode layer 8c. The extraction electrode layers 8a through 8c, which possess electrical conductivity, are spaced apart at a predetermined interval in the longitudinal direction. Moreover, the extraction electrode layers 8a through 8c are laminated on the insulating layer 7 for covering the variable capacitance elements C1 through C4, so as to be connected to their corresponding elements the upper electrode layer portions 5C1 to 5C4 through a through hole drilled in the insulating layer 7. The extraction electrode layer 8a is connected to one conductive layer 42 adjacent to the variable capacitance element C1, and the extraction electrode layer 8b is connected to the other conductive layer 42 adjacent to the variable capacitance element C4. The extraction electrode layers 8a through 8c together are referred to as the extraction electrode layer 8.

The first bias lines B11, B12, and B13 are composed of the conductor lines 32 and 33 and the thin-film resistors 61, 62, and 63. More specifically, the first bias line B11 includes the conductor line 32 and the thin-film resistor 61, for providing connection between the solder connection portion 114 constituting the first bias terminal V1 and the extraction electrode layer 8a acting as the junction point of the first signal terminal I and the variable capacitance element C1. The first bias line B12 includes the conductor lines 32 and 33 and the thin-film resistor 62, for providing connection between the solder connection portion 114 constituting the first bias terminal V1 and the extraction electrode layer 8b acting as the junction point of the variable capacitance element C2 and the variable capacitance element C3. The first bias line B13 includes the conductor line 32 and the thin-film resistor 63, for providing connection between the solder connection portion 114 constituting the first bias terminal V1 and the extraction electrode layer 8c acting as the junction point of the variable capacitance element C4 and the second signal terminal O. The first bias lines B11, B12, and B13 are connected to the first bias terminal V1 by way of the solder connection portion 114, and is further connected, through the first bias terminal V1, to an external circuit.

The conductor line 32 is so formed as to extend along the direction in which the variable capacitance element C1 is arranged, namely, in the longitudinal direction X1 of the supporting substrate 1, and the conductor line 32 is arranged on one side of an array of the extraction electrode layers 8a, 8b, and 8c in a transverse direction X2 perpendicular to the longitudinal direction X1 and the thicknesswise direction of the supporting substrate 1, spaced from the the extraction electrode layers 8a, 8b, and 8c at a predetermined distance.

The thin-film resistors 61, 62, and 63 are so formed as to extend in the transverse direction X2. The conductor line 32 is connected to the conductor line 33 by way of the thin-film resistor 62.

The second bias lines B21 and B22 are composed of the conductor line 31 and the thin-film resistors 64 and 65. More specifically, the second bias line B21 includes the conductor line 31 and the thin-film resistor 64, for providing connection between the solder connection portion 113 constituting the second bias terminal V2 and the junction point of the variable capacitance element C1 and the variable capacitance element C2, namely, the lower electrode layer 2a common to the variable capacitance elements C1 and C2. The second bias line B22 includes the conductor line 31 and the thin-film resistor 65, for providing connection between the solder connection portion 113 constituting the second bias terminal V2 and the junction point of the variable capacitance element C3 and the variable capacitance element C4, namely, the lower electrode layer 2b common to the variable capacitance elements C3 and C4. The second bias lines B21 and B22 are connected to the second bias terminal V2 by way of the solder connection portion 113, and is further connected, through the first bias terminal V1, to an external circuit.

The conductor line 31 is so formed as to extend along the direction in which the variable capacitance element C1 is arranged, namely, in the longitudinal direction X1 of the supporting substrate 1, and the conductor line 31 is arranged on another side of the array of the extraction electrode layers 8a, 8b, and 8c in the transverse direction X2 perpendicular to the longitudinal direction X1 and the thicknesswise direction of the supporting substrate 1, spaced from the the extraction electrode layers 8a, 8b, and 8c at a predetermined distance. The thin-film resistors 64 and 65 are so formed as to extend in the transverse direction X2.

In this way, the variable capacitance elements C1 through C4 are connected in parallel with one another by way of the first bias lines B11, B12, and B13 and the second bias lines B21 and B22 thus configured.

The conductor lines 31, 32, and 33 may be formed by further forming a conductor layer after completing fabrication of the lower electrode layer 2, the thin-film dielectric layer 4, and the upper electrode layer 5. In order to protect the lower electrode layer 2, the thin-film dielectric layer 4, and the upper electrode layer 5 in finished form, the conductor lines 31, 32, and 33 should preferably be formed by using the liftoff technology. In the alternative, the conductor lines 31, 32, and 33 may be formed concurrently with a patterning operation on the lower electrode layer 2.

In order to suppress variation in resistive value among the first bias lines B11, B12, and B13 and the second bias lines B21 and B22, it is desirable that the conductor lines 31 through 33 be made of a low-resistance material, gold (Au). However, considering the fact that the thin-film resistors 61, 62, 63, 64, and 65 exhibit sufficiently high resistance, the conductor lines 31 through 33 may be formed in a common process with the lower electrode layer 2, using the same material as that used for the lower electrode layer 2, for example platinum (Pt).

In order to facilitate formation of the solder connection portions 113 and 114 constituting the first and second bias terminals V1 and V2 at the formation positions thereof on the supporting substrate 1, it is preferable to form conductive layers, using a material possessing electrical conductivity, so as to be electrically connected to the conductor lines 31 and 32, respectively. The conductive layers may be formed separately after completing fabrication of the variable capacitance elements C1 through C4, or may be formed in a common process with the conductor lines 31 through 33, using the same material as that used for the conductor lines 31 through 33. Specifically, in the latter case, the conductor lines 31 through 33 are formed in such a way that the configurations of the conductor lines 31 and 32 corresponding to the positions at which the solder connection portions 113 and 114 constituting the first and second bias terminals V1 and V2 are formed conform to the configurations of the first and second bias terminals V1 and V2. At the same time, the conductive layers are formed integrally with the conductor lines through a patterning operation.

By arranging the first and second bias terminals V1 and V2 in point-symmetrical relationship with respect to the centerline of the variable capacitance capacitor Ct of the invention, namely in positions where the first and second bias terminals V1 and V2 face each other with respect to the plurality of the variable capacitance elements C1 through C4 in a direction perpendicular to an arranging direction of the variable capacitance elements C1 through C4 and to the thicknesswise of the supporting substrate 1, it is possible to arrange, on a wiring board, the variable capacitance capacitor Ct upside down with respect to the original arrangement as shown in the plan view of FIG. 5, namely possible to turn the variable capacitance capacitor Ct 180 degrees about an axis penetrating the center of the figure and perpendicular to the surface of the sheet. This leads to enhanced handleability.

Next, for forming the thin-film resistors 61 through 65 constituting the first bias lines B11, B12, and B13 and the second bias lines B21 and B22, it is desirable to use a material which contains tantalum (Ta) and exhibits a specific resistance of 1 mΩ·cm or above. Tantalum nitride (TaN), a nitride of tantalum and silicon (TaSiN), and an oxide of tantalum and silicon (Ta—Si—O) can be taken as specific examples. For example, in the case of tantalum nitride, as a target, Ta is subjected to sputtering in an atmosphere added with nitride. That is, by adopting the reactive sputtering method, it is possible to form the thin-film resistors 61 through 65 having desired relative proportions and resistivity. Assume that R indicates the resistance of the thin-film resistor 61 to 65; $\rho$ indicates the specific resistance; l indicates the length of the thin-film resistor 61 to 65 along the current-passing direction; w indicates the width of the thin-film resistor 61 to 65; and t indicates the film thickness of the thin-film resistor 61 to 65. The relationship among those elements is given by the following expression: $R=\rho \cdot l/(w \cdot t)$. As will be understood from the relational expression, in a case where the specific resistance is low, the film thickness (t) needs to be decreased, which gives rise to the risk of a break. Also in this case, it is necessary to increase an aspect (length-to-width) ratio (l/w). The aspect ratio cannot be increased without lengthening the thin-film resistor 61 to 65. This leads to an undesirable increase in the size of the component. Therefore, it is desirable to obtain higher specific resistance. On the other hand, if the specific resistance is unduly high, characteristics such as temperature properties and reproducibility may be deteriorated. In light of the foregoing, the degree of the specific resistance is determined in consideration of the possibility of a break, the size of the variable capacitance capacitor Ct as a whole, and the characteristics including temperature properties and reproducibility. For example, in the case of setting the resistance of the bias line at 10 kΩ, the specific resistance is adjusted to be 1 mΩ·cm or above, and the film thickness is adjusted to be 50 nm. Thereby, the aspect ratio can be made as small as 50 or below. Eventually, the desired aspect ratio can be attained that is realizable without increasing the size of the component.

By selecting the conditions as to the sputtering operation appropriately, it is possible to form the thin-film resistors 61 through 65 having a film thickness of 40 nm or above and a specific resistance of 1 mΩ·cm or above. Moreover, after completing the sputtering operation, a resist is coated and processed in a predetermined pattern. With use of the resist as a mask, an etching process such as reactive ion etching (RIE) is performed, thus achieving patterning with ease.

The resistive value for the first bias lines B11, B12, and B13 and the second bias lines B21 and B22 is so determined that the impedance at the first bias lines B11, B12, and B13 and the second bias lines B21 and B22 is larger than the impedance at each of the variable capacitance elements C1 through C4 in a usable frequency region. The usable frequency region is, for example, 100 MHz to 3 GHz. As compared with the resistive value for the thin-film resistors 61 through 65, the resistive value for the conductor lines 31 through 33 is very small. Therefore, the resistive value for the first bias lines B11, B12, and B13 and the second bias lines B21 and B22 is substantially equal to the resistive value for the thin-film resistors 61 through 65. In light of this, the resistive value for the thin-film resistors 61 through 65 is adjusted to be larger than the impedance at each of the variable capacitance elements C1 through C4 in a usable frequency region. For example, it is assumed that the variable capacitance capacitor Ct is operated at a frequency of 1 GHz and the variable capacitance elements C1 through C4 each have a capacitance of 5 pF. In this case, on the basis of 1/10 of the usable frequency (100 MHz), the resistive value for the thin-film resistors 61 through 65 is adjusted to be ten times or more larger than the impedance at the variable capacitance elements C1 through C4 observed at 100 MHz lest the impedance should be adversely affected by a leak of the signal component in the usable frequency region to the first bias lines B11, B12, and B13 and the second bias lines B21 and B22. At this time, the necessary resistive value for the first bias lines B11, B12, and B13 and the second bias lines B21 and B22 is given as about 3.2 kΩ or above. Moreover, assuming that the relative resistivity of the thin-film resistors 61 through 65 is 1 mΩ cm or above in the variable capacitance capacitor and the resistive value for the first bias lines B11, B12, and B13 and the second bias lines B21 and B22 is determined to be 10 kΩ, then the aspect ratio (length/width) of the thin-film resistors 61 through 65 can be made as small as 50 or below provided that the film thickness is 50 nm. Eventually, the thin-film resistors 61 through 65 exhibit a desired aspect ratio that is realizable without increasing the size of the constituent element.

The first bias lines B11, B12, and B13 and the second bias lines B21 and B22 including the thin-film resistors 61 through 65 are formed directly on the supporting substrate 1. This eliminates the need to add an insulating layer, over the variable capacitance elements C1 through C4, for ensuring insulation between the lower electrode layer 2 and the upper electrode layer 4 and the extraction electrode layer 8, and thus helps reduce the number of layers constituting the variable capacitance elements C1 through C4. Moreover, by the use of the thin-film resistors 61 through 65 of high resistance, it is possible to make the variable capacitance capacitor Ct as compact as possible.

Next, the insulating layer 7 having electrical isolation is essential to ensure insulation between the extraction electrode layer 8 formed thereon and the lower electrode layer 2. The insulating layer 7 serves also to cover the first bias lines B11, B12, and B13 and the second bias lines B21 and B22, thereby protecting the thin-film resistors 61 through 65 against oxidation. This makes it possible to maintain the resistive value for the first bias lines B11, B12, and B13 and the second bias lines B21 and B22 constant secularly, and thereby enhance the reliability of the construction. The insulating layer 7 should preferably be made of at least one kind of materials selected among from silicon nitride and silicon oxide from the viewpoint of improving the moisture resistance. It is desirable that the insulating layer 7 be formed by means of the chemical vapor deposition (CVD) or the like method in consideration of coatability.

Moreover, the insulating layer 7 may be processed in a predetermined pattern by means of dry etching or the like method with use of an ordinary resist. The insulating layer 7 has a through hole drilled therein so as to reach the conductor line 33 for ensuring connection between the thin-film resistors 61 through 65 and the extraction electrode layer 8. Aside from the through hole, it is desirable that the upper electrode layer 4 and the solder connection portions 111, 112, 113, and 114 be all that are exposed from the insulating layer 7, from the viewpoint of improving the moisture resistance.

Next, the extraction electrode layer 8 is so formed as to establish connection between the upper electrode layer 5C1 portion constituting the first variable capacitance element C1 and the first signal terminal I, namely, the conductive layer 42 formed at the position where the first signal terminal I is formed, establish connection between the upper electrode layer 5C2, 5C3 portions constituting the variable capacitance elements C2 and C3, respectively, and establish connection between the upper electrode layer 5C4 portion constituting the variable capacitance element C4 and the second signal terminal O, namely, the conductive layer 42 formed at the position where the second signal terminal O is formed, through the through hole formed in the insulating layer 7. Because of such a configuration of the extraction electrode layer 8, the variable capacitance elements C1 through C4 are connected in series with one another across the first signal terminal I and the second signal terminal O. Moreover, the extraction electrode layer 8b portion which is laid across the variable capacitance elements C2 and C3 is connected to the conductor line 33 through the through hole of the insulating layer 7. As a material for forming the extraction electrode layer 8, it is desirable to use a low-resistance metal material such as gold (Au) or copper (Cu). In addition, an adhesive layer made of titanium (Ti) or nickel (Ni) may be formed from the viewpoint of enhancing the adherability between the extraction electrode layer 8 and the insulating layer 7.

At the time of forming the extraction electrode layer 8, it is preferable to form a layer at the positions where the input terminal I, the output terminal O and the first and second bias terminals V1 and V2 are formed. The layer is the same in material as the extraction electrode layer 8. This makes it possible to make uniform the levels of positions at which the first signal terminal I, the output terminal O and the first and second bias terminals V1 and V2 are formed, namely to make uniform the levels of positions from one surface 1A of the supporting substrate 1 at which the solder connection portions 111, 112, 113, and 114 are formed, thereby enhancing the mountability of the construction.

Next, the protective layer 9 is so formed as to cover substantially the entire surface of the construction, with the solder connection portions 111, 112, 113, and 114 left exposed. The protective layer 9 provides not only mechanical protection but also protection against chemical attack for the constituent components of the variable capacitance capacitor Ct including the variable capacitance element C1. Note that the protective layer 9 must be formed in such a way that the solder connection portions 111, 112, 113, and 114 are left exposed without fail. For forming the protective layer 9, it is desirable to use a material that has electrical isolation and exhibits high heat resistance and excellent coatability with undulating configurations. To be specific, a resin material such as polyimide resin or BCB (benzocyclobutene) is suitable for use. The protective layer 9 is formed by coating the resin material, followed by curing the resin at a predetermined temperature.

The solder diffusion inhibiting layer 10 is formed for the purpose of preventing solder materials for forming the solder connection portions 111, 112, 113, and 114 from spreading toward the extraction electrode layer 8 or the lower electrode layer 2, at the time of executing reflow entailed by the formation of the solder connection portions 111, 112, 113, and 114 or at the time of mounting. As a material used for the solder diffusion inhibiting layer 10, Ni is desirable. In order to gain enhanced solder wettability, the solder diffusion inhibiting layer 10 may have its surface coated with a material exhibiting excellent solder wettability, such as Au or Cu, in a thickness of approximately 0.1 µm, as desired.

Lastly, the solder connection portions 111, 112, 113, and 114 are formed on the solder diffusion inhibiting layer 10 to facilitate mounting of the variable capacitance capacitor Ct on an external wiring board. In general, the solder connection portions 111, 112, 113, and 114 are fabricated by printing a solder paste using a mask of predetermined type, followed by executing reflow.

As described heretofore, according to the variable capacitance capacitor Ct, by the use of the thin-film resistors 61 through 65 that contain tantalum nitride and exhibit a specific resistance of 1 mΩ·cm or above as the first bias lines B11, B12, and B13 and the second bias lines B21 and B22, or as apart thereof, it is possible to reduce the aspect ratio of the thin-film resistors 61 through 65, and thereby achieve miniaturization of the variable capacitance capacitor Ct as a whole. Moreover, by forming the first bias lines B11, B12, and B13 and the second bias lines B21 and B22 directly on the supporting substrate 1, it is possible to reduce the number of layers constituting the constituent elements including the variable capacitance element C1. Further, some conductor layers and dielectric layers constituting the constituent elements can be obtained in a common formation process. This helps facilitate the fabrication of the variable capacitance capacitor greatly, in spite of its relatively complicated structure.

Now, a description will be given below as to a method for manufacturing the variable capacitance capacitor Ct' embodying the invention.

Figure 7:
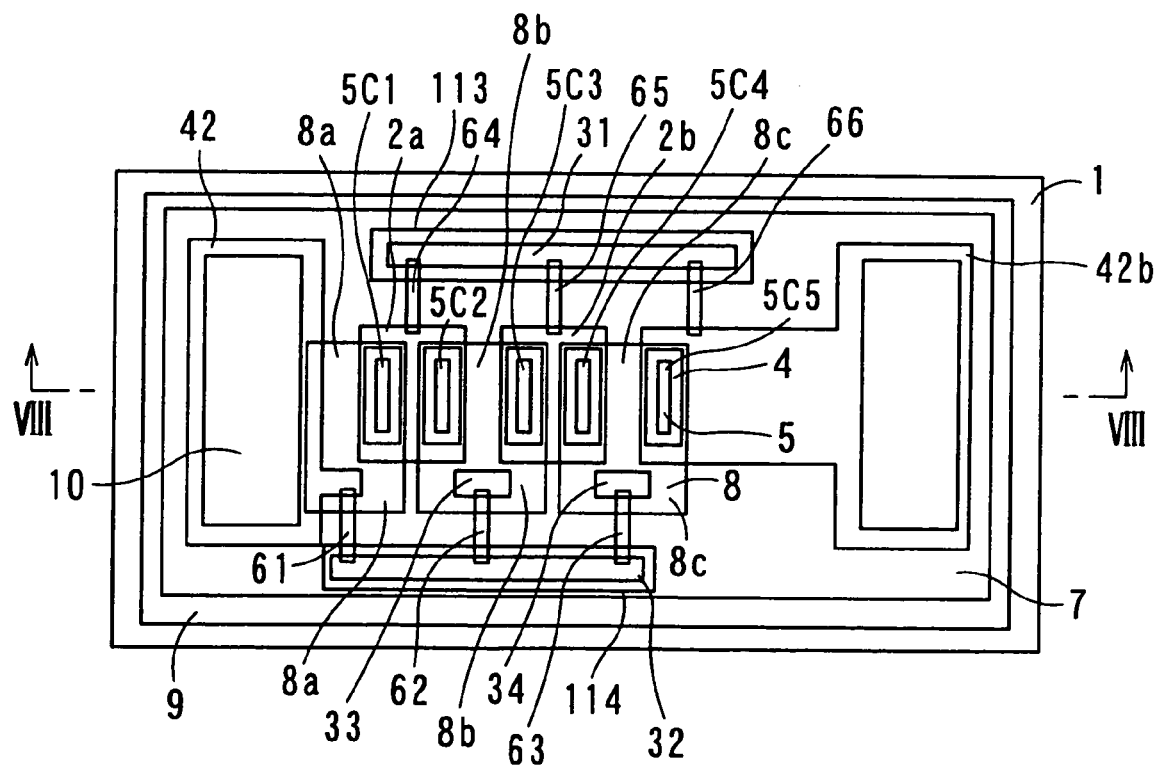
FIG. 7 is a plan view showing in a sight-through state an example of the variable capacitance capacitor shown in FIGS. 4A and 4B.
Figure 8:
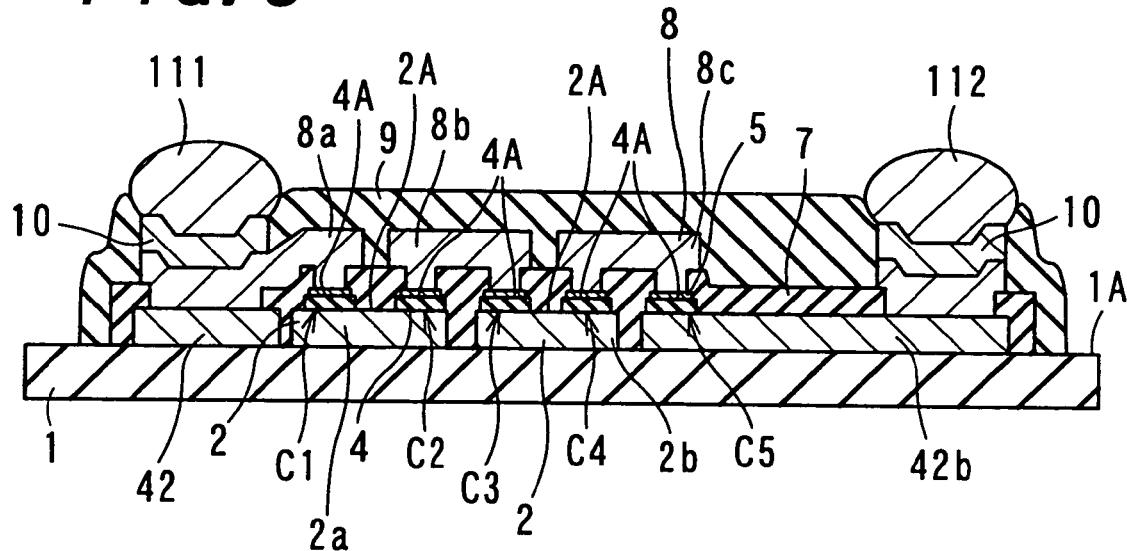
FIG. 8 is a sectional view of the variable capacitance capacitor taken along line VIII—VIII of FIG. 7.

FIG. 7 is a plan view showing in a sight-through state an example of the variable capacitance capacitor Ct' having five pieces of variable capacitance elements C1 through C5. FIG. 8 is a view of the variable capacitance capacitor Ct' taken along line VIII—VIII of FIG. 7. In these figures, the constituent components that play the same or corresponding roles as in FIGS. 5 and 6 will be identified with the same reference symbols, and overlapping descriptions will be omitted.

In FIGS. 7 and 8, symbol C5 represents a variable capacitance element. The variable capacitance element C5 is formed between the variable capacitance element C4 and the output terminal O in a common formation process with the variable capacitance elements C1 through C4, using the same material as that used for them. The lower electrode layer portion corresponding to the variable capacitance element C5 is formed integrally with the conductor layer 42b adjacent to the variable capacitance element C4. Then, the thin-film dielectric layer 4 is laminated on the conductor layer 42b. On the thin-film dielectric layer 4 is laminated an upper electrode layer portion 5C5. In constituting the variable capacitance elements C1 through C5, the thin-film dielectric layers 4 and the upper electrode layers 5 are identically sized. The extraction electrode layer 8c provides connection between the upper electrode layer portions 5C4 and 5C5.

Reference numeral 34 represents a conductor line, and reference numeral 66 represents a thin-film resistor. As a bias supply circuit, the first bias line B13 is composed of the conductor line 34 and the thin-film resistor 63, and the second bias line B23 is composed of the conductor line 31 and the thin-film resistor 66. The thin-film resistor 63 connects the conductor line 34 and the extraction electrode layer 8c. The thin-film resistor 66 connects the conductor line 31 and the electrode layer 42b.

The first bias line B13 and the second bias line B23 are obtained in a common formation process with the first bias lines B11 and B12 and the second bias lines B21 and B22, using the same material as that used for them.

Moreover, the insulating layer 7 has a through hole drilled therein so as to reach the conductor lines 33 and 34 for ensuring connection between the thin-film resistor 61 and the extraction electrode layer 8c, and at the through hole a part of the thin-film resistor 61 is formed and the thin-film resistor 61 are connected with the extraction electrode layer 8c.

The variable capacitance elements C1 through C5 are connected in series with one another across the first signal terminal I and the second signal terminal O as follows. For example, at the outset, the first signal terminal I is electrically connected to the upper electrode layer 4 portion constituting the variable capacitance element C1 by way of the extraction electrode layer 8. Then, the variable capacitance elements C1 and C2 are electrically connected to each other through the use of a common lower electrode layer 2 portion. Next, the upper electrode layer 4 portions constituting the variable capacitance elements C2 and C3 respectively are electrically connected to each other by way of the extraction electrode layer 8. Likewise, subsequently, the variable capacitance elements C3 and C4 are electrically connected to each other through the use of a common lower electrode layer 2 portion, the upper electrode layer 4 portions constituting the variable capacitance elements C4 and C5 respectively are electrically connected to each other by way of the extraction electrode layer 8, and finally the variable capacitance element C5 is electrically connected to the output terminal O through the use of a common lower electrode layer 2 portion.

As described heretofore, according to the variable capacitance capacitor Ct', it is possible to achieve commonality among the first and second signal terminals I and O acting as signal terminals for supplying a high-frequency signal and the bias terminals V1 and V2 for supplying a bias signal to which the first and second bias lines are connected. That is, the first signal terminal I and the bias terminal V1 can be formed in a common group, and likewise the second signal terminal O and the bias terminal V2 can be formed in a common group. As a result, the variable capacitance capacitor Ct' has a high degree of flexibility in mounting and in pattern design, and is thus easy to handle. In this construction, there is no need to form the solder connections 113 and 114.

Figure 10:
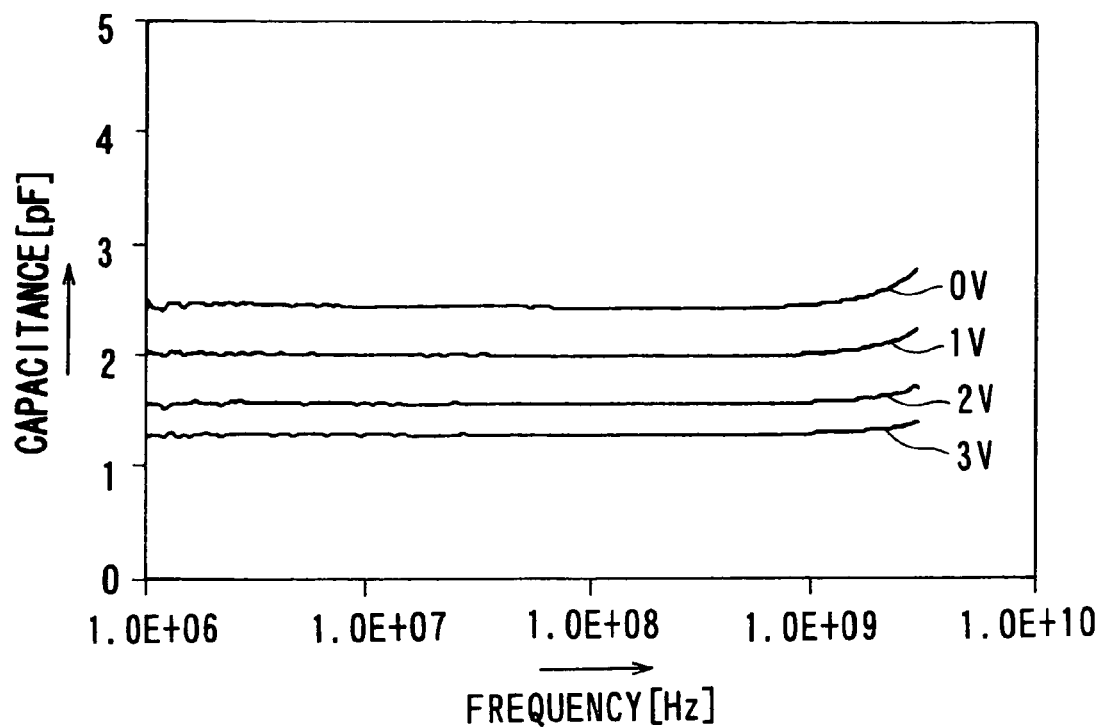
FIG. 10 is a graph showing the relationship between the frequency of a high-frequency signal and the capacitance value of the variable capacitance capacitor.

FIG. 10 is a graph showing the relationship between the frequency of a high-frequency signal and the capacitance value of the variable capacitance capacitor Ct. In FIG. 10, the frequency of a high-frequency signal is taken along the horizontal axis (unit: Hz) and the capacitance value of the variable capacitance capacitor Ct is taken along the vertical axis (unit: pF). As shown in the graph depicted in FIG. 10, the variable capacitance capacitor Ct varies in capacitance value according to the level of a bias voltage placed between the first and second bias terminals V1 and V2 (0 V, 1 V, 2 V, and 3 V, as exemplified). The voltage of a high-frequency signal is set at 0.5 Vrms. That is, in the variable capacitance capacitor Ct embodying the invention, its capacitance value depends upon the bias voltage placed between the first and second bias terminals V1 and V2, specifically, the greater the bias voltage, the smaller the capacitance value. Meanwhile, the change of the frequency of a high-frequency signal exerts little influence upon the capacitance value of the variable capacitance capacitor Ct, but only within the range from 1 MHz to 3 GHz. In other words, the variable capacitance capacitor Ct succeeds in suppressing such capacitive variation as is induced by the high-frequency signal. Thus, in a high-frequency electronic component employing the variable capacitance capacitor, occurrence of distortion such as waveform distortion or intermodulation distortion can be reduced greatly.

Figure 11:
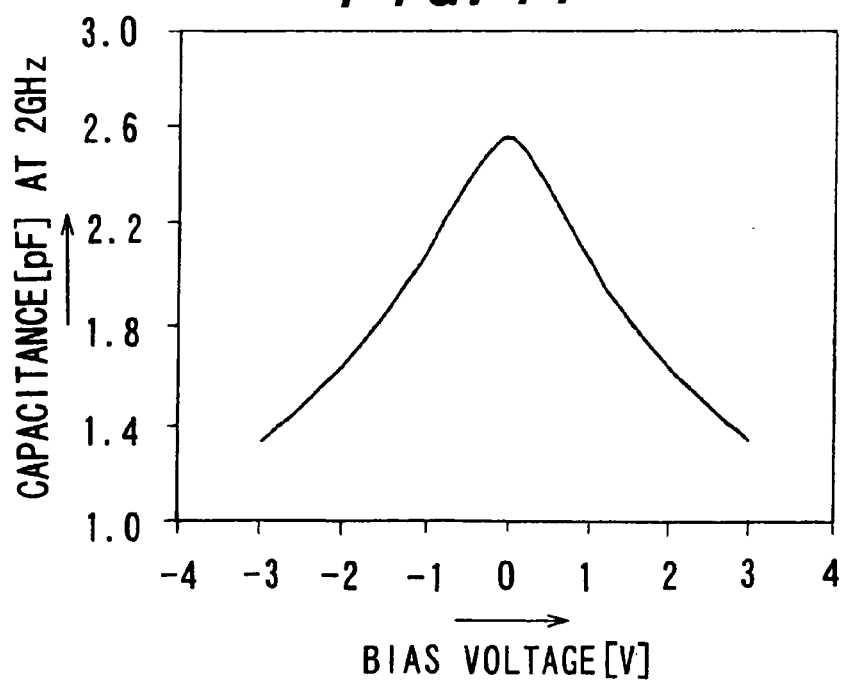
FIG. 11 is a graph showing the relationship between a bias voltage applied between first and second bias terminals of the variable capacitance capacitor and a capacitance value of the variable capacitance capacitor at an input of a high-frequency signal of 2 GHz.
Figure 12:
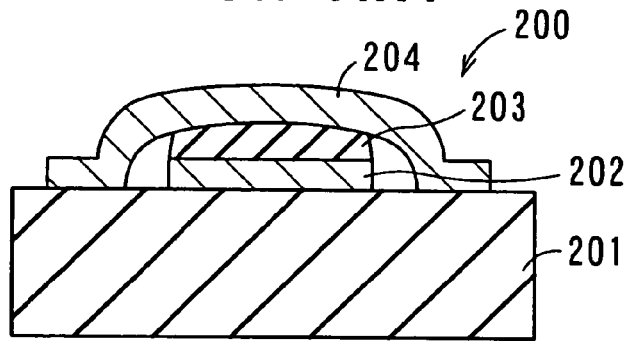
FIG. 12 is a sectional view showing an example of a conventional thin-film capacitor.
Figure 13A:
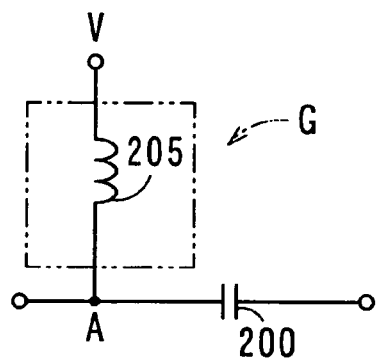
FIGS. 13A and 13B are equivalent circuit diagrams each showing a conventional capacitor.
Figure 13B:
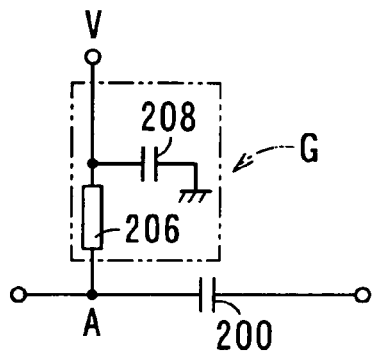

FIG. 11 is a graph showing the relationship between a bias voltage placed between the first and second bias terminals V1 and V2 of the variable capacitance capacitor Ct and the capacitance value of the variable capacitance capacitor Ct at a high-frequency signal of 2 GHz. In FIG. 11, a bias voltage is taken along the horizontal axis (unit: V) and the capacitance value is taken along the vertical axis (unit: pF). The voltage of the high-frequency signal is set at 0.5 Vrms. As will be understood from the graph, by increasing or decreasing a bias voltage, it is possible to cause the capacitance of the variable capacitance capacitor Ct to vary. Here, assume that the second bias terminal V2 corresponds to a bias voltage of 0 V, then the value of the bias voltage is given by a positive number when a positive electric potential is imparted to the first bias terminal V1. Moreover, assume that the second bias terminal V2 corresponds to a bias voltage of 0 V, then the value of the bias voltage is given by a negative number when a negative electric potential is imparted to the first bias voltage V1. The capacitance of the variable capacitance capacitor Ct rises to a maximum value at a bias voltage of 0 V. As the bias voltage is gradually increased to be greater than 0 V, the capacitance of the variable capacitance capacitor Ct is decreased correspondingly. On the other hand, as the bias voltage is gradually decreased to be less than 0 V, namely, as the absolute value of the bias voltage is increased, the capacitance of the variable capacitance capacitor Ct is decreased correspondingly. The capacitance value of the variable capacitance capacitor Ct is found to be approximately 2.6 pF at a bias voltage of 0 V. On the other hand, the capacitance value of the variable capacitance capacitor Ct is found to be approximately 1.4 pF at a bias voltage of 3 V in absolute value. In this way, only with a slight variation in bias voltage, the capacitance value of the variable capacitance capacitor Ct can be nearly doubled.

Next, a circuit module and a communications apparatus embodying the invention will be described hereinbelow.

A circuit module of the invention is constituted by a resonant circuit comprising the above-described variable capacitance capacitor of the invention, at least one of an inductor and a resistor, and a voltage supply section capable of applying a voltage thereto. In this construction, since the variable capacitance capacitor of the invention is utilized as a capacitor constituting the resonant circuit, it follows that the rate of capacitive variation in the capacitor is sufficiently high and a desired capacitance can be obtained with high accuracy. Thereby, a desired resonant frequency can be obtained in a wider frequency range with high accuracy in accompaniment with application of a direct current bias voltage. Moreover, with the excellence in power handling capability of the variable capacitance capacitor, the circuit module is excellent in reliability, manufacturability, and productivity. Further, in a case where an even number of variable capacitance elements are provided, the polarity of a direct current bias voltage hardly counts, which results in an advantage in attaining satisfactory handleability.

Furthermore, the communications apparatus of the invention comprises the above-described circuit module used as filter means. For example, the communications apparatus can be constructed by providing such filter means in each of send and receive circuits, followed by connecting the send and receive circuits to each other by way of a send/receive switching device. For realizing the filter means, a band-pass filter is suitable for use. The band-pass filter is composed, for example, of a combination of the above-described circuit module, an inductor, a capacitor, and so forth. The use of the band-pass filter makes it possible to determine a desired resonant frequency in a wider frequency range with high accuracy, with the result that the range of usable frequencies can be widened and a desired pass band can be obtained with high accuracy. As described herein above, according to the communications apparatus of the invention, a desired resonant frequency can be determined in a wider frequency range with high accuracy. As a result, the filter means is operable in a wider range of frequencies, and is also capable of functioning in a desired manner with high accuracy.

Figure 9:
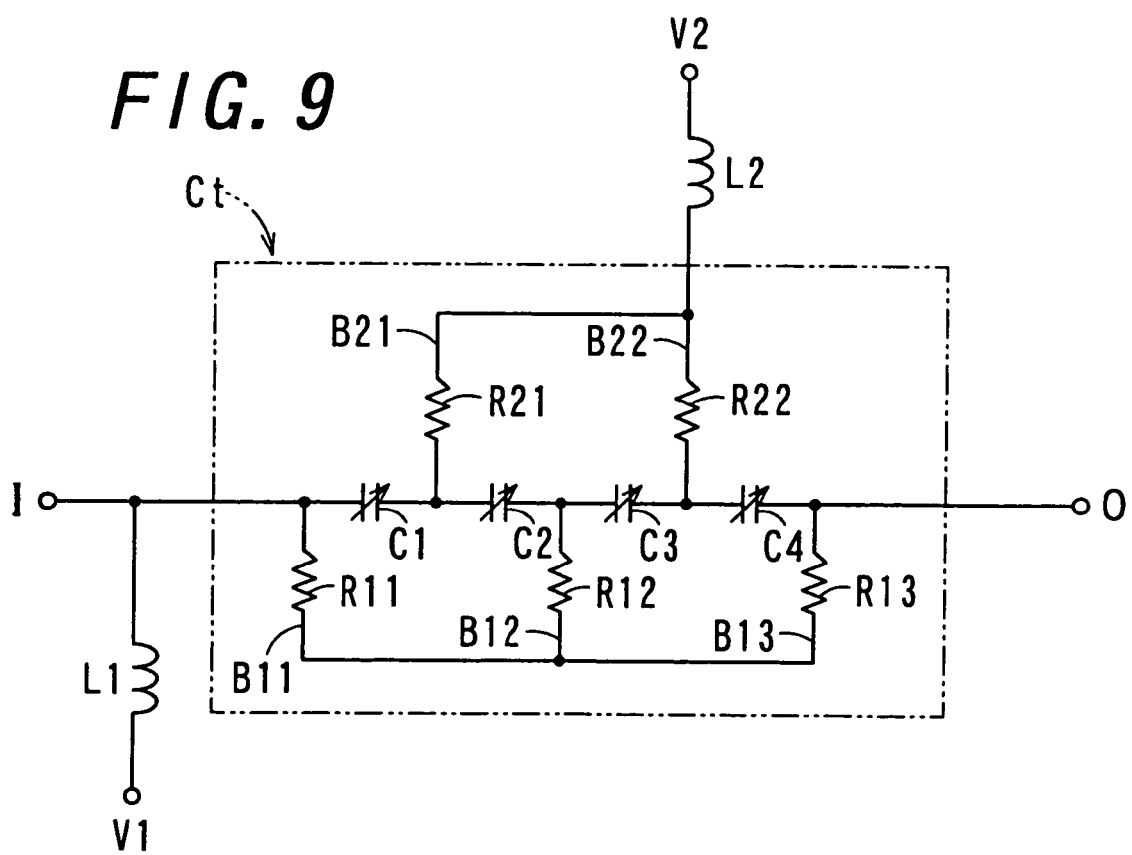
FIG. 9 is an equivalent circuit diagram showing a variable capacitance capacitor on which a bias supply circuit is individually disposed, according to another example of the embodiment of the invention.

In conclusion, the invention should not be interpreted to be limited to the examples described above, and a variety of modifications and changes may be made in the invention without departing from the spirit of the invention. For example, in one embodiment described thus far, while the first bias lines B11, B12, and B13 and the second bias lines B21 and B22 acting as a bias supply circuit are formed in a common structure, the bias lines B11, B12, B13, B21, and B22 may be formed individually with respect to each of the variable capacitance elements C1 through C4. Moreover, as shown in FIG. 9, a bias voltage V1 may be received at the input terminal I. Moreover, as shown in FIG. 9, the bias terminal V1 is so located as for a bias voltage to be received at the input terminal I. The variable capacitance capacitor Ct shown in FIG. 9 has basically the same structure as the variable capacitance capacitor Ct shown in FIG. 1, the only difference being the position of the bias terminal V1 for supplying a bias voltage. Further, the number of the variable capacitance elements constituting the variable capacitance capacitor is not particularly limited to four or five.

It is also possible to form, in a plurality of regions on the supporting substrate 1, the variable capacitance capacitor of the invention composed of the series-connected variable capacitance elements. Moreover, the first and second bias lines may be composed of an inductor or a transmission line.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A variable capacitance capacitor comprising:
   an array of a plurality of variable capacitance elements connected in series with one another between high-frequency signal input and output terminals, each of the variable capacitance elements employing a thin-film dielectric layer whose dielectric constant is caused to vary with application of a voltage; and
   a first bias line belonging to a high-potential side in terms of voltage application; and
   a second bias line belonging to a low-potential side in terms of voltage application,
   the first and second bias lines being connected, alternately, to an electrode connected to the input terminal of the variable capacitance element array, electrodes of the variable capacitance elements connected with one another, and an electrode connected to the output terminal of the variable capacitance element array.

2. The variable capacitance capacitor of claim 1, wherein the plurality of variable capacitance elements are classified under two groups: a variable capacitance element group A consisting of variable capacitance elements where the first bias line is connected relatively to the input terminal side electrode thereof, and a variable capacitance element group B consisting of variable capacitance elements where the first bias line is connected relatively to the output terminal side electrode thereof, and the variable capacitance element groups A and B have a substantially equal capacitance value.

3. The variable capacitance capacitor of claim 2, wherein the plurality of variable capacitance elements are constituted by an even number of variable capacitance elements.

4. The variable capacitance capacitor of claim 3, wherein the variable capacitance element group A and the variable capacitance element group B are constituted by a pair of the variable capacitance elements having a substantially equal capacitance value.

5. The variable capacitance capacitor of claim 3, wherein the plurality of the variable capacitance elements have a substantially equal capacitance value.

6. The variable capacitance capacitor of claim 3, wherein the variable capacitance element connected to the input terminal and the variable capacitance element connected to the output terminal, have a capacitance value larger than the other variable capacitance elements.

7. The variable capacitance capacitor of claim 4, wherein the variable capacitance element connected to the input terminal and the variable capacitance element connected to the output terminal, have a capacitance value larger than the other variable capacitance elements.

8. The variable capacitance capacitor of claim 2, wherein the plurality of the variable capacitance elements are constituted by an odd number of variable capacitance elements.

9. The variable capacitance capacitor of claim 2, wherein the variable capacitance element connected to the input terminal and the variable capacitance element connected to the output terminal, have a capacitance value larger than the other variable capacitance elements.

10. The variable capacitance capacitor of claim 8, wherein the variable capacitance element connected to the input terminal and the variable capacitance element connected to the output terminal, have a capacitance value larger than the other variable capacitance elements.

11. The variable capacitance capacitor of claim 1, wherein the variable capacitance element connected to the input terminal and the variable capacitance element connected to the output terminal, have a capacitance value larger than the other variable capacitance elements.

12. The variable capacitance capacitor of claim 1, wherein the thin-film dielectric layer is made of a perovskite-type oxide crystal containing Ba, Sr, and Ti.

13. The variable capacitance capacitor of claim 1, wherein the first and second bias lines are so designed that their impedance is larger than the impedance at each of the variable capacitance elements in a usable frequency region.

14. A circuit module comprising the variable capacitance capacitor of claim 1, used as a capacitor constituting a resonant circuit.

15. A communications apparatus comprising the circuit module of claim 14, used as filter means.

* * * * *